(12) United States Patent
Allocca et al.

(10) Patent No.: US 9,483,387 B1
(45) Date of Patent: Nov. 1, 2016

(54) TREE COMPARISON FUNCTIONALITY FOR SERVICES

(71) Applicant: Amazon Technologies, Inc., Reno, NV (US)

(72) Inventors: William Wallace Allocca, Bellevue, WA (US); Michael Carl Brant, Seattle, WA (US); Vikas Singh, Seattle, WA (US); Sanyuan Tang, Seattle, WA (US); Arun Vashishtha, Newcastle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

(21) Appl. No.: 14/216,832

(22) Filed: Mar. 17, 2014

(51) Int. Cl.
*G06F 11/00* (2006.01)
*G06F 11/36* (2006.01)

(52) U.S. Cl.
CPC ....... *G06F 11/3688* (2013.01); *G06F 11/3684* (2013.01); *G06F 11/3692* (2013.01)

(58) Field of Classification Search
CPC ........... G06F 11/3688; G06F 11/3692; G06F 11/3684
See application file for complete search history.

(56) References Cited

U.S. PATENT DOCUMENTS

| | | | | |
|---|---|---|---|---|
| 7,028,223 | B1* | 4/2006 | Kolawa | G06F 11/3688 714/37 |
| 2002/0120648 | A1* | 8/2002 | Ball | G06F 17/30899 715/234 |
| 2005/0144555 | A1* | 6/2005 | Morris | G06F 17/2247 715/234 |
| 2007/0250482 | A1* | 10/2007 | Yao | G06F 17/2229 |
| 2010/0313149 | A1* | 12/2010 | Zhang | G06F 17/30893 715/760 |
| 2014/0013205 | A1* | 1/2014 | Mikhaiel | G06F 17/2247 715/234 |
| 2015/0193399 | A1* | 7/2015 | Woker | H04L 41/02 715/234 |

* cited by examiner

*Primary Examiner* — Yolanda L Wilson
(74) *Attorney, Agent, or Firm* — Lee & Hayes, PLLC

(57) ABSTRACT

The techniques described herein provide for comparison of tree structures. In some examples, a system according to this disclosure may receive at least a first item including a first tree structure and a second item including a second tree structure. The system may compare the first item and the second item. In particular, in performing the comparison, the system may detect a sub-tree structure type in the first tree structure and in the second tree structure. In some examples, the sub-tree structure type is one of one or more sub-tree structure types that have corresponding matching processes. Once determined, the system described herein may perform the corresponding matching process of the detected sub-tree structure type for the first tree structure and the second tree structure.

20 Claims, 11 Drawing Sheets

```
              AUTHORITY RESPONSE                    CANDIDATE RESPONSE
                     802                                    804

<ITEMMAP>                              <ITEMMAP>
          <ITEMS>                                <ITEMS>
            <ITEM>                                 <ITEM>
              <ENTRY>                                <ENTRY>
                <STRING>NAME</STRING>                  <STRING>NAME</STRING>
                <STRING>PRODUCTX</STRING>              <STRING>PRODUCTY</STRING>
              </ENTRY>                               </ENTRY>
              <ENTRY>                                <ENTRY>
                <STRING>TAXABLE</STRING>               <STRING>COST</STRING>
                <STRING>TRUE</STRING>                  <STRING>75.0</STRING>
              </ENTRY>                               </ENTRY>
              <ENTRY>                                <ENTRY>
                <STRING>COST</STRING>                  <STRING>TAXABLE</STRING>
                <STRING>100.00</STRING>                <STRING>0</STRING>
              </ENTRY>                               </ENTRY>
            </ITEM>                                </ITEM>
            <ITEM>                                 <ITEM>
              <ENTRY>                                <ENTRY>
                <STRING>NAME</STRING>                  <STRING>NAME</STRING>
                <STRING>PRODUCTY</STRING>              <STRING>PRODUCTX</STRING>
              </ENTRY>                               </ENTRY>
              <ENTRY>                                <ENTRY>
                <STRING>TAXABLE</STRING>               <STRING>COST</STRING>
                <STRING>TRUE</STRING>                  <STRING>100</STRING>
              </ENTRY>                               </ENTRY>
              <ENTRY>                                <ENTRY>
                <STRING>COST</STRING>                  <STRING>TAXABLE</STRING>
                <STRING>75.00</STRING>                 <STRING>YES</STRING>
              </ENTRY>                               </ENTRY>
            </ITEM>                                </ITEM>
          </ITEMS>                               </ITEMS>
        </ITEMMAP>                             </ITEMMAP>
```

┌─────────────────────────────┐  ┌─────────────────────────────┐
│     POTENTIAL HIRE 1002     │  │      IDEAL HIRE 1004        │
│                             │  │                             │
│ <HIREDATA>                  │  │ <HIREDATA>                  │
│   <CHARACTERISTICS>         │  │   <CHARACTERISTICS>         │
│     <ITEM>                  │  │     <ITEM>                  │
│       <ENTRY>               │  │       <ENTRY>               │
│         <STRING>DEGREE</STRING>   │         <STRING>DEGREE</STRING>
│         <STRING>COMP SCI</STRING> │         <STRING>COMP SCI</STRING>
│       </ENTRY>              │  │       </ENTRY>              │
│       <ENTRY>               │  │       <ENTRY>               │
│         <STRING>GPA</STRING>│  │         <STRING>GPA</STRING>│
│         <STRING>3.8</STRING>│  │         <STRING>3.0-4.0</STRING>
│       </ENTRY>              │  │       </ENTRY>              │
│       <ENTRY>               │  │       <ENTRY>               │
│         <STRING>GRADYEAR</STRING> │         <STRING>GRADYEAR</STRING>
│         <STRING>2004</STRING>     │         <STRING>2002-2008</STRING>
│       </ENTRY>              │  │       </ENTRY>              │
│       <ENTRY>               │  │       <ENTRY>               │
│         <STRING>INFIELD</STRING>  │         <STRING>INFIELD</STRING>
│         <STRING>4.5</STRING>│  │         <STRING>5-8</STRING>│
│       </ENTRY>              │  │       </ENTRY>              │
│     </ITEM>                 │  │     </ITEM>                 │
│     <ITEM>                  │  │     <ITEM>                  │
│       <ENTRY>               │  │       <ENTRY>               │
│         <STRING>INTERVIEWER</STRING> │      <STRING>INTERVIEWER</STRING>
│         <STRING>JOHN SMITH</STRING>  │      <STRING>*</STRING>
│       </ENTRY>              │  │       </ENTRY>              │
│       <ENTRY>               │  │       <ENTRY>               │
│         <STRING>PEOPLESKILL</STRING> │      <STRING>PEOPLESKILL</STRING>
│         <STRING>8</STRING>  │  │         <STRING>6-10</STRING>
│       </ENTRY>              │  │       </ENTRY>              │
│       <ENTRY>               │  │       <ENTRY>               │
│         <STRING>LANGSKILLS</STRING>  │      <STRING>LANGSKILLS</STRING>
│         <STRING>7</STRING>  │  │         <STRING>5-10</STRING>
│       </ENTRY>              │  │       </ENTRY>              │
│       <ENTRY>               │  │       <ENTRY>               │
│         <STRING>OWNERSHIP</STRING>   │      <STRING>OWNERSHIP</STRING>
│         <STRING>4</STRING>  │  │         <STRING>6-10</STRING>
│       </ENTRY>              │  │       </ENTRY>              │
│     </ITEM>                 │  │     </ITEM>                 │
│   </CHARACTERISTICS>        │  │   </CHARACTERISTICS>        │
│ </HIREDATA>                 │  │ </HIREDATA>                 │
└─────────────────────────────┘  └─────────────────────────────┘
```

PRODUCT X 1102

```
<ITEMMAP>
  <ITEMS>
    <ITEM>
      <ENTRY>
        <STRING>NAME</STRING>
        <STRING>PRODUCTX</STRING>
      </ENTRY>
      <ENTRY>
        <STRING>TAXABLE</STRING>
        <STRING>TRUE</STRING>
      </ENTRY>
      <ENTRY>
        <STRING>COST</STRING>
        <STRING>100.00</STRING>
      </ENTRY>
      <ENTRY>
        <STRING>DESCLINK</STRING>
        <STRING>LINK1</STRING>
      </ENTRY>
      <ENTRY>
        <STRING>UPC</STRING>
        <STRING>1234567</STRING>
      </ENTRY>
      <ENTRY>
        <STRING>AVERREV</STRING>
        <STRING>3.5</STRING>
      </ENTRY>
    </ITEM>
  </ITEMS>
</ITEMMAP>
```

PRODUCT Y 1104

```
<ITEMMAP>
  <ITEMS>
    <ITEM>
      <ENTRY>
        <STRING>NAME</STRING>
        <STRING>PRODUCTY</STRING>
      </ENTRY>
      <ENTRY>
        <STRING>COST</STRING>
        <STRING>75.0</STRING>
      </ENTRY>
      <ENTRY>
        <STRING>TAXABLE</STRING>
        <STRING>0</STRING>
      </ENTRY>
      <ENTRY>
        <STRING>DESCLINK</STRING>
        <STRING>LINK2</STRING>
      </ENTRY>
      <ENTRY>
        <STRING>UPC</STRING>
        <STRING>1234567</STRING>
      </ENTRY>
      <ENTRY>
        <STRING>AVERREV</STRING>
        <STRING>4.5</STRING>
      </ENTRY>
    </ITEM>
  </ITEMS>
</ITEMMAP>
```

FIG. 11

TREE COMPARISON FUNCTIONALITY FOR SERVICES

BACKGROUND

Software architects often engage in a process of improving software after deployment of the software. The improvements may be implemented by modifying a software system or by creating a new software system (e.g., a replacement system), where the modified or new software system is intended to replace or operate beside the current software system. Deployment of the modified or the new software system may have an impact on hardware that supports the software system (e.g., require more or less processing power and/or time), may impact outcomes resulting from user interaction (e.g., satisfy, annoy, or frustrate users, etc.), or may have other possible outcomes (e.g., include bugs, etc.). Therefore, it is desirable to perform a comparison test to compare results following execution of the modified or new software system against results following execution of the current software system prior to a full deployment of the modified or new software system. However, comparison tests of current software systems with modified or new software systems may result in failure to detect differences and/or in the detection of differences that are unimportant or otherwise not meaningful. In particular, some comparison tests may stop comparing two data structures, such as tree structures, at the first imperfect match which, for example, could be the result of random differences or due to the representation of the same value differently in the modified system (e.g., floating point value precision or Boolean representation). As such, meaningful differences may not be presented to users.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 8 is a diagram of a pair of responses with tree structures to be compared.

FIG. 10 is a diagram of a pair of tree structures to be compared.

FIG. 11 is a diagram of a pair of tree structures to be compared.

DETAILED DESCRIPTION

Figure 1:
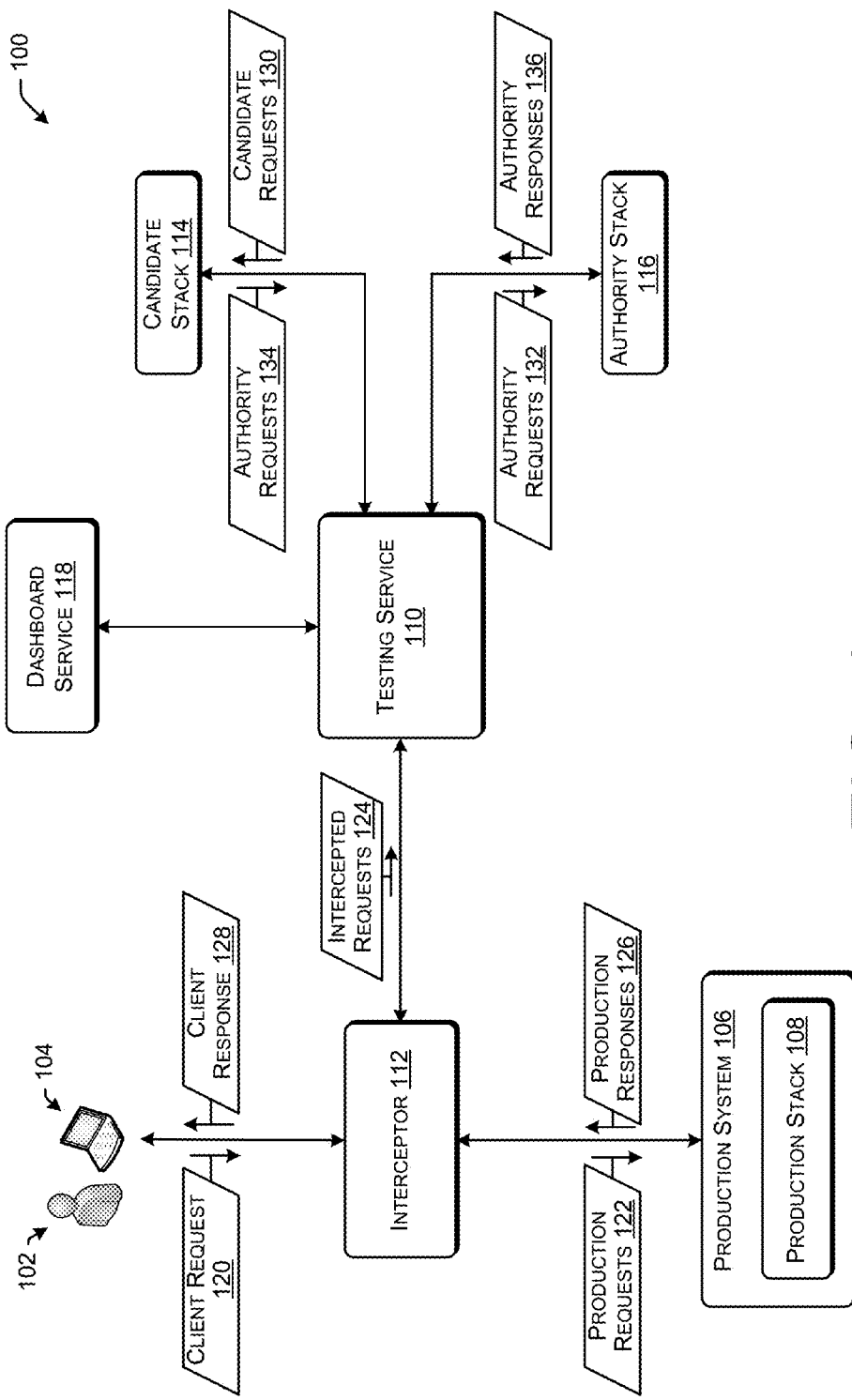
FIG. 1 is a schematic diagram of an illustrative environment that provides software testing of one or more software systems using intercepted requests.

This disclosure is directed in part to the comparison of data structures. In particular, the techniques and systems disclosed herein may be utilized to compare tree structures as well as to compare other types of data structures. The attributes of items to be compared, such as a product or person, may be represented in a tree structure. The items may then be compared by finding differences in the respective tree representations. In some implementations, if the trees meet a threshold level of differences, the items may be considered to not be a match. In some implementations, the tree structures may be represented in a serialization format such as Extensible Markup Language (XML), "YAML Ain't Markup Language" (YAML) or JavaScript Object Notation (JSON).

In some implementations, the tree comparison techniques may be used for software testing. For example, some implementations may comprise a testing service that may operate to perform testing using at least one intercepted request, which is a duplicate of or is based on a production request to a current (e.g., a deployed or "live") production software system. The testing service may operate a candidate software system that may be a candidate version of the production software system or a similarly functioning software system (e.g., a trial or test version, a replacement software system, a new implementation, etc.). In some implementations, the testing service may further operate an authority software system which may be a software system or version of a software system which is used for validating the candidate software system or candidate version of the software system (e.g., the authority software system may be a mirror copy of the production software system).

The testing service may be part of the production system, a separate system, or part of another system. The production software system may update production system data and may transmit data back to the end users while the intercepted request handled by the candidate software system (and any authority software system(s)) does not output to the users and/or affect the production system. In some implementations, the testing service may operate to compare a response to a candidate request from the candidate system to a response to a corresponding authority (or production) request from the corresponding authority (or production) system. The testing service may also operate to compare the processing of the respective systems in generating the responses.

Such a comparison operation may be referred to herein as a candidate test. In contrast to typical A/B testing, the testing of the candidate software system may occur without updating production system data and thus may be used to test system functionality and performance when executing requests that are based on actual client requests (i.e., that were or are processed with the production software system).

The tree structure comparison techniques described herein may be utilized in many ways by the testing service. For example, the candidate and authority responses may include tree structures that are compared to validate the candidate software system. In another example, metadata or other data about the processing of the candidate and authority requests to generate the candidate and authority responses may be stored in a tree structure. These structures may be compared to, for example, test the performance or other characteristics of the candidate software system (e.g.

over a large number of responses). These are merely examples and the tree comparison techniques described herein may be used to compare any other data represented in a tree or similar structure by the testing service.

As alluded to above, in some implementations, the testing service may operate to allow for the above described functions to be performed with respect to different software systems, software implementations, and/or different versions. In other words, in some implementations, the candidate software system is not limited to a new version of a production software system. For example, the "candidate software system" of some implementations may be a different implementation of the production software system based on a different framework and/or may include a different interface or the like.

The techniques and systems described herein may be implemented in a number of ways and are not limited to those specifically discussed herein. In particular, though the description of the tree comparison techniques herein is primarily in the context of a testing service, this is merely for ease of illustration and is not meant to be viewed as limiting on the disclosed techniques and systems. For example, the disclosed tree comparison techniques and systems may be applied in a wide variety of other applications such as reverse matching or in determining whether differences between two items outweigh similarities between the items. The implementations provided below with reference to the figures are merely examples.

FIG. 1 is a schematic diagram of an illustrative environment 100 that provides for software testing of one or more candidate software systems using a testing service. As shown in FIG. 1, the illustrative environment 100 includes a user 102 operating a user device 104 and a production system 106 operating a production stack 108, a testing service 110 and an interceptor 112. The testing service 110 includes, interacts with and/or operates a candidate stack 114, an authority stack 116 and a dashboard service 118. While shown as stand-alone items, one of ordinary skill in the art would understand that the candidate stack 114 and the authority stack 116 may be operated by system resources, such as testing service system resources, production system resources or other system resources. These system resources may be computing devices, distributed or non-distributed computing services, server farm(s) or other types of resources that can execute the various software systems. FIG. 1 also illustrates an exemplary testing service system which, in the implementation shown in FIG. 1, includes the testing service 110, interceptor 112, candidate stack 114, authority stack 116 and the dashboard service 118. In some implementations, the testing service system may comprise a test framework. In some such implementations, the test framework may be exposed as a web service for external clients.

In operation, the user 102 (e.g., a downstream consumer or user) may, using a user device 104, transmit a client request 120 for electronic data from the production system 106. However, in some implementations, the client request 120 may be a request generated by another service, the production system 106, or another process, and may not be a human-generated request. The production system 106 may be part of an electronic marketplace, an electronic financial service, a messaging service, a social network, and/or any other service that exchanges electronic data with users. The production system 106 may operate various versions of a software system that are executable in a framework and processed by production system resources. The versions may include the version of the software system utilized by the production stack 108 that is currently deployed to fulfill user requests, such as client request 120.

The interceptor 112 intercepts at least some requests sent to the production system 106, such as the client request 120, and forwards (or publishes) the requests to the production stack 108 as production requests 122. In addition, the interceptor 112 (or another component of the testing service system) may store the intercepted requests 124. The production stack 108 processes the production requests 122 normally using the production software system and replies with production responses 126. For example, if the client request 120 requested electronic data from the production system 106, the corresponding production response 126 may include the requested data. In the example implementation shown in FIG. 1, the interceptor 112 may act as a relay, receiving the production responses 126 and forwarding the production responses 126 to their respective recipients. For example, the interceptor 112 relays the production response 126 that corresponded to the client request 120 to the user device 104 as a client response 128. While the example implementation shown in FIG. 1 shows the interceptor 112 operating as a relay in the manner discussed above, this is not limiting and has been done for ease of illustration. In other implementations, the production stack 108 could reply directly without the interceptor 112 acting as relay.

In addition to forwarding production requests 122 to the production stack 108, the interceptor 112 may forward the intercepted requests 124 to the testing service 110 for use by the testing service 110 in testing. To handle testing in general, the testing service system may use a protocol for testing with standardized meta-data for requests and responses. For example, regarding the meta-data, the interceptor 112 may extract some basic meta-data about the intercepted request 124, service, and/or realm and store the meta-data for use by the testing service 110 along with or as part of the intercepted request 124. The interceptor 112 may operate so as to allow the requests to be intercepted in an asynchronous, non-blocking manner to minimize the potential for disruption of the production system 106 due to, for example, failures in the testing service system (such as a failure of the interceptor 112). Though not shown in the illustrated implementation, in some implementations, similar interception and meta-data extraction operations may be performed for the production responses 126. For example, the intercepted production responses may be used in place of authority responses. In some such implementations, the interceptor 112 may provide the intercepted requests and intercepted responses to the testing service 110 at the same time.

In some implementations, the interception of requests and/or responses for the testing service 110 may be configurable, such as on a per application programming interface (API) level. Some configurable parameters may include a publishing percentage, a sampling methodology, etc. Further, the interceptor 112 may operate based on multiple sets of interception rules, scenarios, tests, etc. For example, in some implementations, the interceptor 112 may be configured to intercept and forward a first percentage (e.g., 50%) of an indicated first type of client request 120 (e.g., product search, purchase order, etc.) and to intercept and forward a second percentage (e.g., 40%) of an indicated second type of client request 120. Further, the interceptor 112 may be configured to cap the forwarding of intercepted requests. For example, the interceptor 112 may be configured to cap the interception and forwarding of the first type of client request 120 at five (5) client requests 120 per second and the interception and forwarding of the second type of client request 120 at eight (8) client requests 120 per second. In another example, the interceptor 112 may be configured to intercept and forward an indicated percentage of all client requests 120 with a cap of twenty-five (25) requests per second. Moreover, these are merely examples of the configuration of the interceptor 112 and implementations may include any combination of these and/or other configurable parameters.

The testing service 110 processes the intercepted requests 124. Depending on the processing desired, the testing service 110 operates to replay the intercepted requests 124 to one or more of the production stack 108, candidate stack 114, the authority stack 116 and/or other stacks. This is illustrated in FIG. 1 as the candidate requests 130 and the authority request 132, respectively.

As mentioned above, the candidate stack 114 is a stack operating a candidate software system which is to be validated, such as an altered application stack or software system that is to be validated or a new software system or implementation of the software system being adopted for the production system 106. The authority stack 116 is a stack operating software system(s) which may be used for validating the software system operated by the candidate stack 114 in some types of testing.

In some implementations, the authority stack 116 may be a most recent version of a software system of the production system 106 known to have acceptable functionality and performance. The software system operated by the authority stacks 116 may be a mirror copy of the software system of the production stack 108 operated by the production system 106. In some implementations, the production stack 108 may be operated to perform the functions of the authority stack 116. In such a case, in some implementations, the authority request 132 may be sent to the production system 106 by the testing service 110 and may be tagged such that the production stack 108 knows the authority request 132 is a shadow requests and should be returned to the testing service 110 instead of the user device 104 and that the processing of the authority request 132 should not result in changes in production system data used to perform production requests 122.

In some implementations, the testing service 110 may operate to dynamically modify at least some of the parameters of the intercepted requests 124 before replaying the requests as shadow requests to the candidate stack 114 and authority stack 116. In such an implementation, the testing service 110 may preserve the integrity of the modified shadow requests, apart from the intended modifications, to faithfully replay the shadow requests.

In operation, the candidate stack 114 and the authority stack 116 receive the candidate request 130 and the authority request 132, respectively, from the testing service 110 and each processes the received request according to its respective software system. As mentioned above, in some implementations, unlike the processing performed by the production system 106 for the production request 120, the processing at the candidate stack 114 and authority stack(s) 116 may not be revealed or reported to users (e.g., user 102) and/or may not modify data used by the production system 106. Thus, any outputs and/or manipulations of data from the candidate stack 114 and authority stack 116 may not be seen by the user 102 and/or used to generate data that is later output to the user 102. Instead, the processing by the candidate stack 114 and the authority stack 116 is used to test execution of the software system operated by the candidate stack 114. Upon completion of the processing of each of the candidate requests 130 and the authority request 132, the candidate stack 114 and the authority stack 116 send a candidate response 134 or authority response 136 to the testing service 110, respectively. While FIG. 1 shows the candidate stack 114 and authority stack 116 as operating separately as independent entities, implementations are not so limited. Rather, in various implementations, the operations of the candidate stack 114 and authority stack 116 may be performed in parallel, sequentially, or at other times by the same or different computing devices of the testing system or another system.

To perform the candidate test, upon receiving a candidate response 134 and corresponding authority response 136, the testing service 110 may compare the fields contained in the candidate response 134 and the authority response 136 along with other information such as latency data or other performance metrics and logs the results. The results of the comparison and the logs are then available for use by the components of the testing service 110 and dashboard service 118. In some implementations, the responses 134 and 136 or the other information about the candidate testing may include one or more tree data structures, for example, in a serialization format (e.g., XML, JSON and other serialization formats). The testing service 110 may perform various operations to determine differences between the tree data structures of the responses 134 and 136 which will be described with respect to FIGS. 2 and 5-9.

Except where explicitly noted otherwise, with regard to the remaining discussion, authority responses and production responses being used in the candidate test will be discussed as authority or control responses due to the similar treatment of the responses. Still, as would be recognized by one of ordinary skill in the art, the treatment of the authority responses 136 and intercepted production responses may differ in some implementations.

Figure 2:
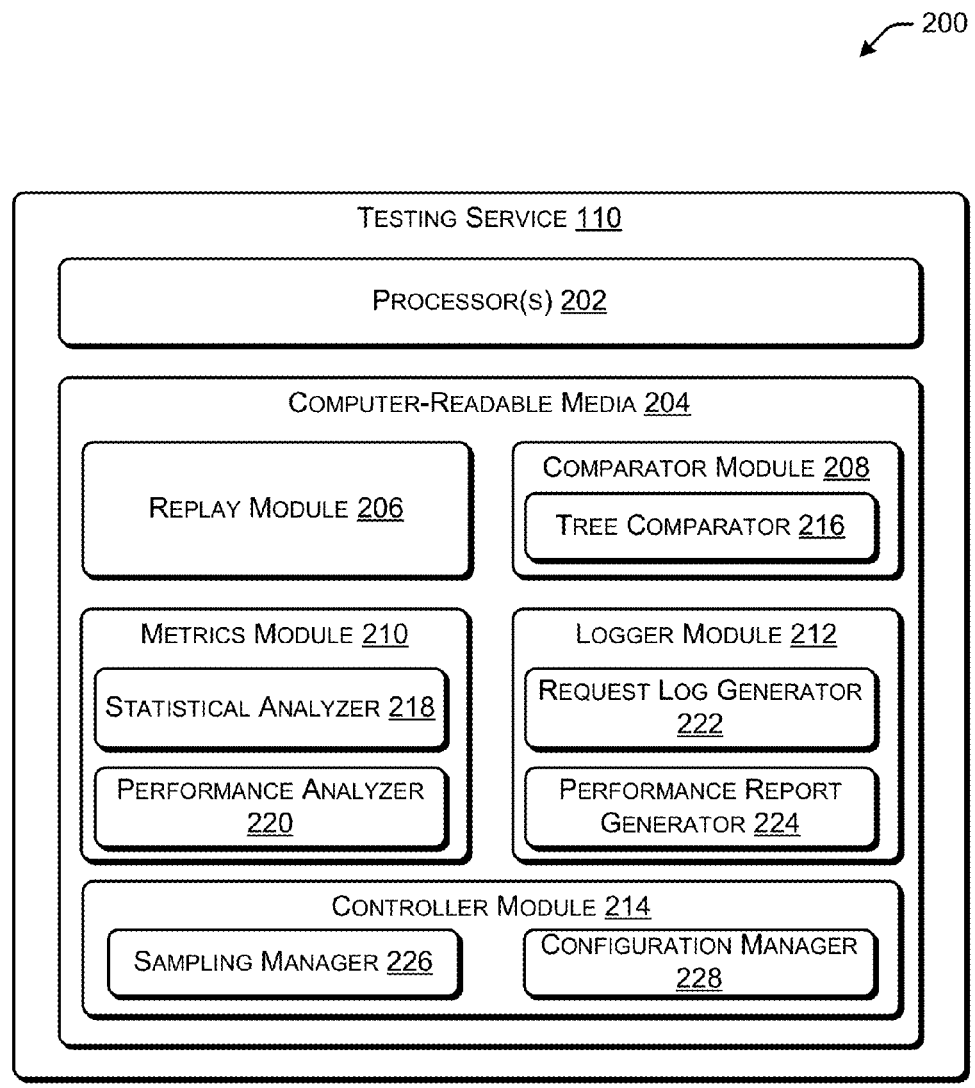
FIG. 2 is a schematic diagram of an illustrative computing architecture to provide a testing service for software testing of one or more software systems using intercepted requests.

FIG. 2 is a schematic diagram of an illustrative computing architecture 200 of an example testing service 110 that provides for software testing of one or more software systems using intercepted requests. The computing architecture 200 may be implemented in a distributed or non-distributed computing environment.

The computing architecture 200 may include one or more processor(s) 202 and computer readable media 204 that store various modules, applications, programs, or other data. The processor(s) 202 may be a single processing unit or a number of processing units, all of which may include single or multiple computing units or multiple cores. The processor(s) 202 can be implemented as one or more hardware processors such as microprocessors, microcomputers, microcontrollers, digital signal processors, central processing units, state machines, logic circuitries, and/or any devices that manipulate signals based on operational instructions. Among other capabilities, the processor 202 can be configured to fetch and execute computer-readable instructions stored in the computer-readable media 204, a mass storage device, or other computer-readable media. The computer-readable media 204 may include instructions that, when executed by the one or more processors 202, cause the processors to perform the operations described herein for the testing service 110. In some embodiments, the computer-readable media 204 may store a replay module 206, a comparator module 208 and associated components, a metrics module 210 and associated components, a logger module 212 and associated components, and a controller module 214 and associated components, which are described in turn. The components may be stored together or in a distributed arrangement.

The replay module 206 may operate to replay the intercepted requests 124 to the candidate stack 114 and, in a least some cases, the authority stack 116. In the following discussion, it should be understood that the authority stack 116 may not be utilized for all operations of the testing service 110 (e.g. in operations in which production responses 130 and/or the results of authority requests to the production system 106 are utilized). Thus, simultaneous discussion of the operations of the candidate stack 114 and authority stack 116 is for convenience and not limitation.

In summary, in some implementations, the replay module 206 operates to impersonate the entity making the request and interacts with the candidate stack 114 and authority stack 116 in accordance with this role. In some implementations, the replay module 206 operates to dynamically modify at least some of the parameters of the intercepted requests 124 before replaying the requests to the candidate stack 114 and authority stack 116 as the candidate requests 130 and authority requests 132. For example, the replay module 206 may modify candidate requests 130 to the candidate stack 114 to simulate specific behavior for test purposes. In such an implementation, the replay module 206 may preserve the integrity of the modified shadow request, apart from the intended modifications, to faithfully replay the shadow request.

As mentioned above, in some implementations, the candidate stack 114 may operate a candidate software system which is a different implementation of the software system operated by the production stack 106 or the authority stack 116 (e.g., an implementation utilizing a different framework or interface to similar core logic). The candidate stack 114 may also operate a candidate software system which is an entirely different software system to that operated by the production stack 106 or the authority stack 116. In these and similar scenarios, the replay module 206 may operate to modify the intercepted requests 124 to match a specification of the candidate software system operated by candidate stack 114.

Upon receiving the candidate response 134 and authority response 136 corresponding to a particular intercepted request 124, the replay module 206 may extract meta-data for the responses and publish the responses and meta-data to the comparator module 208. Some examples of meta-data that may be extracted include information that may be used to derive latency data or other performance metrics.

The comparator module 208 may receive the candidate response 134 and authority response 136 and, perform a candidate test between the candidate response 134 and the authority response 136. In some implementations, the comparator module 208 tags and/or classifies at least some of the differences that are ascertained between the responses. For example, the comparator 208 may tag or classify candidate test differences which are specified to be important or unacceptable to the functioning of the software system.

In some implementations, extensible modeling language based definitions may be used to define the comparison and replay by the testing service 110 based on a standardized format. Using such definitions, the comparator module 208 may allow differences based on planned functionality changes in the candidate stack 114 to be suppressed (e.g. ignored). In some implementations, such suppression of differences based on planned functionality changes in the candidate stack 114 may be implemented at a variety of levels and/or other modules rather than by the comparator module 208. The results of the comparison module 208 are provided to the metrics module 210 and the logger module 212.

It should be noted that the differences determined in the candidate test are not limited to any particular type of differences. For example, the differences that are tagged may also include processing differences not discussed herein. An example of a processing difference is a difference in the processing of the request which may not change the result of the request or result in a latency difference in the response but which causes non-critical error messages or issues unnecessary or superfluous internal requests and may represent an additional processing burden on another system or process. A large number of such processing differences may cause other services or systems to become overwhelmed without an apparent difference in the timing or content of the response to the request.

As mentioned above, in some implementations, the candidate response 134 and the authority response 136 may be or may include tree structures or other similar data structures that are to be compared. In general, the attributes of items, such as a product or a person, may be represented in a tree structure. The two items can then be compared by finding differences in the respective tree structure representations. Depending on the implementation, if the two trees meet a threshold of similarities or differences, the trees may be considered to be or not to be a match.

In some implementations including that illustrated in FIG. 2, the comparator 208 includes a tree comparator 216 that operates to perform comparisons for tree structures. Although some implementations may perform a simple exact matching algorithm to determine if the trees are a match, such an approach may result either in differences not being detected or the detection of an apparent difference that is either not really a difference or in the detection of a difference that is not meaningful, for example, due to different representations of the same float or Boolean value. In other cases, the exact matching algorithm may stop comparing at the first node of the tree structure that has an apparent difference and not even attempt to match the children of the apparently different node. In some implementations, a user may desire to see the differences between the children.

In some implementations, the tree comparator 216 may operate to address one or more of the following example problems with an exact matching algorithm: 1) differences in attributes of nodes with matching tags blocking further comparison; 2) different representations of the same value causing false mismatch; 3) differences in node ordering not being detected causing false mismatch; 4) missing nodes and/or extra nodes leading to sub-tree mismatch. It should be noted that, depending on the details of the implementation, some of the above listed example problems may or may not need to be addressed. For example, the first example problem may occur in the case of a comparison of the following XML data structures:

TABLE 1

| <Michael age="24"> | <Michael experience="1.5"> |
|---|---|

More generically, the problem may result from a compound declaration resulting in a premature determination of a mismatch. In the example shown in Table 1, the comparison is of two statements that are compound declaration as they both declare the tag and an attribute of the node. The tag of the two nodes is the same, Michael. However, the attributes are different, one being "age" and the other being "experience." Thus, if an exact matching approach is used to compare the tree structures of Table 1, the comparison will find a mismatch. In implementations that include functionality to or are configurable to address this problem, the two nodes may be compared as if the data structures were presented in an expanded, non-compound form such as that shown in Table 2:

TABLE 2

| <Michael> | <Michael> |
|---|---|
| <age>24</age> | <experience>1.5</experience> |
| </Michael> | </Michael> |

Thus, when a comparison is performed, the tags are compared and matched. Then, since the tags match, the attributes are compared but found to have a mismatch in attribute type. Thus, such implementations may recognize the tree nodes as having the same tag, Michael, but as having different attributes.

Depending on the implementation and use of the tree matching techniques disclosed herein, this may or may not be a meaningful difference. For example, in a candidate test scenario in which the two structures are intended to convey the same information about the tag, "Michael," this difference may be significant and meaningful. On the other hand, in a lookup or matching scenario, the difference is not indicative of a mismatch. Rather, since the difference is in the attribute (i.e., in the type of data being compared), some implementations may ignore the difference and find the trees to match or at least determine that the trees relate to the same tag.

Additional functionality of the tree comparator 216 is set forth with respect to FIGS. 5-9

In some implementations, the comparator 208 may, or may be configurable to, omit and/or filter some of the results that the comparator 208 provides to the metrics module 210. For example, the comparator 208 may omit and/or filter the results based on whether the differences are determined to be meaningful. In some implementations, such filtering and/or omitting may also be performed by selectively suppressing such differences in the results such that some differences for a candidate response will be reported while other differences will be suppressed.

The metrics module 210 may generate metrics from the results of the processing by the candidate stack 114 and the authority stack 116 that were provided by the comparator module 208. In some implementations, the statistical analyzer 218 may determine a trend in the number of differences identified by the comparator module 208 to be meaningful, the number of differences identified by the comparator module 208 to be unacceptable, determine the number of unacceptable differences identified, capture the trend and/or cause an alarm to be sent to the dashboard service 118, and so on. The statistical analyzer 218 may determine positive or negative trends for the candidate software system operated by the candidate stack 114. For example, the statistical analyzer 218 may determine that a particular client request is indicative of or correlated with a particular outcome (either good or bad). The statistical analyzer 218 may then indicate or record the trend to enable the dashboard service 118 to report the trend and allow for appropriate action to be taken, if necessary. The statistical analyzer 218 may also use confidence levels when determining the trends. The performance analyzer 220 may determine or measure performance trends based on performance of each of the candidate stack 114 and the authority stack 116. The performance analyzer 220 may determine how the system resources are responding to use of the different versions or software systems, include processing of spikes in activity, response time, memory allocation, throughput, bandwidth, or other system performance measurement attributes. The system performance may be analyzed using business metrics, system level metrics (e.g., memory usage, processor usage, etc.), and/or application level metrics (e.g., bugs, errors, difference count, etc.). For example, the performance analyzer 220 may provide statistics on latency differences between the candidate software system of the candidate stack 114 and the authority software system of the authority stack 116. The metrics module 210 or the comparator module 208 may also determine when a candidate software system operated by the candidate stack 114 includes a bug or other error. Further, in some embodiments, the results of the metrics module 210 and/or the comparator module 208 may be used to identify a failing service in a cascading sequence of service calls where the failing service is a downstream service that is causing differences in one or more upstream services. The results of the statistical analyzer 218 and performance analyzer 220 may be output at least to the logger module 212. As with the comparator 208, the operations of the metrics module 210 may take into account whether differences between the candidate stack response and/or processing and the authority stack response and/or processing are determined to be meaningful. Such operations may be configurable to allow for adjustable inclusion or reporting thresholds based on a determined likelihood that a candidate test difference is a meaningful difference. In some implementations, different classifications of candidate test differences may be treated differently based on the determined likelihood that the candidate test differences are meaningful.

The logger module 212 shown in FIG. 2 may comprise at least two components, a request log generator 222 and a performance report generator 224. The request log generator 222 logs data related to the intercepted requests 124, candidate requests 130 and authority requests 132 which have been processed by the production stack 108, candidate stack 114, authority stack 116, replay module 206, comparator module 208 and/or metrics module 210. The request log generator 222 may log all data relating the intercepted requests 124 or some appropriate subset, depending on the particular implementation and configuration settings. In some implementations, the request log generator 222 may store the requests, responses and differences. For example, the request log generator 222 may store the requests, responses and differences in distributed computing-based storage, with indexed fields for searching. The performance report generator 224 may generate a performance report, which may be based at least in part on an output of the performance analyzer 220.

As mentioned above, many operations of the replay module 206, the comparator module 208, the metrics module 210 and the logger module 212, as well as the interceptor 112, are configurable. In the implementation shown in FIG. 2, the configuration settings are controlled at least in part by a controller module 214. In particular, a sampling manager 226 of the controller module 214 controls aspects of the interceptor 112 and the testing service 110 relating to determining which of the client requests 120 are to be intercepted and forwarded as the intercepted requests 124, which of the intercepted requests 124 are actually processed by the testing service 110 as described above, and so on. The sampling manager 226 may consult the configuration manager 228 which interacts with the various systems and users (such as the dashboard service 118) to obtain the configuration settings for the testing service 110. Each of the interceptor 112, replay module 206, comparator module 208, metrics module 210, and logger module 212 may consult the configuration manager 228 to obtain configuration information or the configuration manager 228 may directly configure the other modules. One example operation performed by the sampling manager 226 may be to receive a predetermined confidence level and then calculate the number of samples (intercepted requests) necessary to achieve the predetermined confidence level. Such a confidence level may be determined based on various factors such as a number of unacceptable differences per a number of intercepted requests, a requirement that some measurement of code paths have been exercised or a mix of use cases to be covered during the testing. In addition to the configurability discussed above, the testing service system of some implementations may allow for pluggable modules based on a standardized interface. Such implementations may allow for custom modules which adhere to the standardized interface to be plugged into the testing service system in place of the default modules (e.g., a custom comparator module 208 and custom metrics module 210 in place of the default modules).

Figure 3:
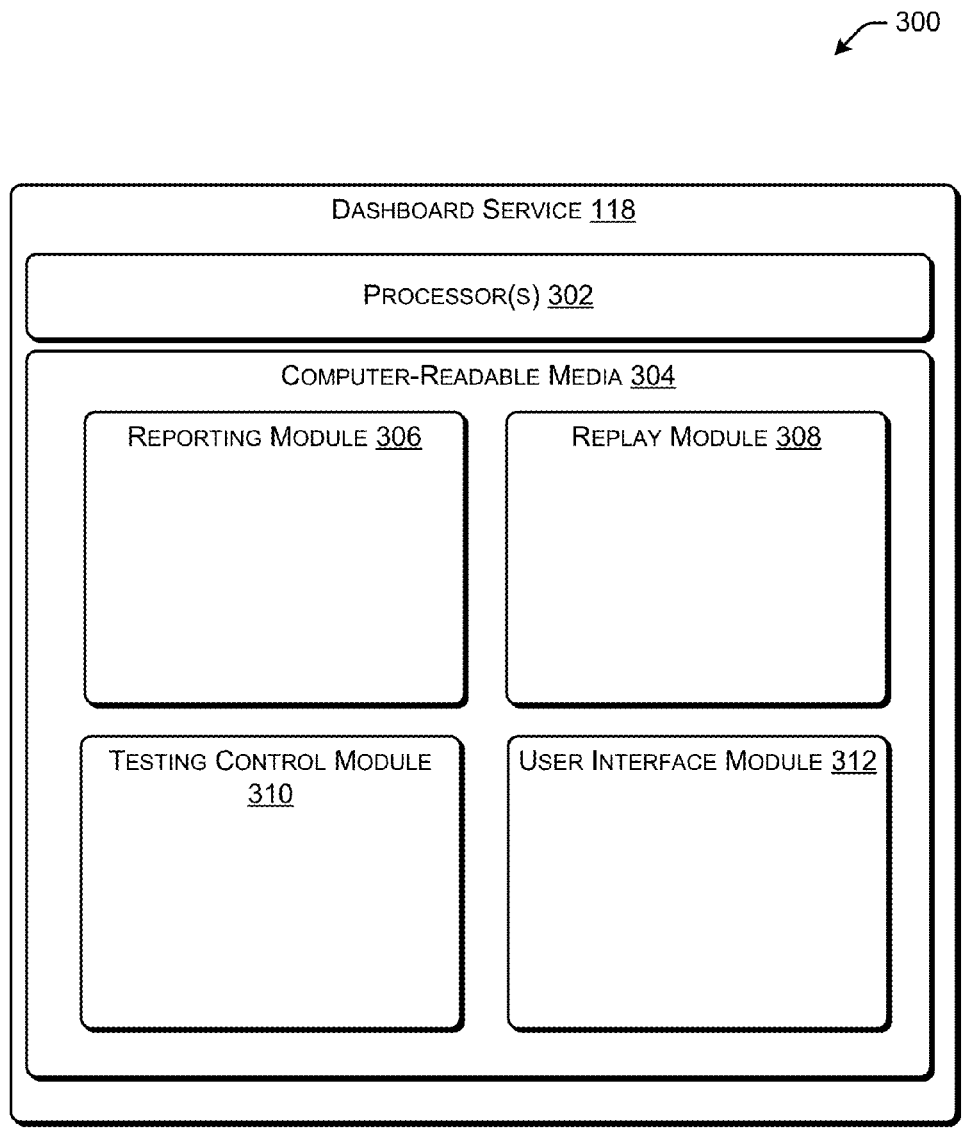
FIG. 3 is a schematic diagram of an illustrative computing architecture to provide a dashboard service for software testing of one or more software systems using intercepted requests.

FIG. 3 is a schematic diagram of an illustrative computing architecture 300 of an example dashboard service 118 that provides interaction with and/or control of the testing service 110. The computing architecture 300 may be implemented in a distributed or non-distributed computing environment.

Similar to the computing architecture 200, the computing architecture 300 may include one or more processors 302 and computer readable media 304 that stores various modules, applications, programs, or other data. The computer-readable media 304 may include instructions that, when executed by the one or more processors 302, cause the processors to perform the operations described herein for the dashboard service 118. In some embodiments, the computer-readable media 304 may store a reporting module 306, a replay module 308, a testing control module 310 and a user interface module 312, which are described in turn. The components may be stored together or in a distributed arrangement.

As mentioned above, the dashboard service 118 provides for interaction with and/or control of the testing service 110. In some implementations, the dashboard service 118 provides the interaction and/or control, in at least two regards. First, the dashboard service 118 collects and parses the results logged by the logger module 212, providing users of the dashboard service 118 with this information. Second, the dashboard service 118 interacts with the controller module 214 to configure the testing service 110, configure the interceptor 112 and/or to setup and request replay of one or more intercepted requests 124. For example, the dashboard service 118 may setup and request the replay of a set of the intercepted requests 124 represented in the logs generated by the request log generator 222 or the intercepted requests 124 as received from the interceptor 112. To select the one or more logged or stored intercepted requests 124 to be replayed, the dashboard service 118 may provide search and display capability for stored requests and differences.

For example, subsequent to a change in the candidate stack 114, the dashboard service 118 may request that the testing service 110 replay the intercepted requests 124 that resulted in meaningful unacceptable differences between the candidate responses 134 and authority response 136 to a new/altered/different candidate stack 114 and, in some implementations, to the authority stack 116 as well. Once the intercepted requests 124 have been replayed, either the testing service 110 or the dashboard service 118 may make a comparison between the new responses and the original responses to determine if the unacceptable differences have been resolved. The general purpose of modules 306-312 in the example implementation shown in FIG. 3 is discussed below, followed by a discussion of the example operations performed by, or caused to be performed by, these modules.

The reporting module 306 may operate to collect or receive the data generated by the logger module 212 and any other data, and prepare the data for presentation to a user via the user interface module 312. For example, the reporting module 306 may collect the trend data generated by the metrics module 210 and prepare this data for presentation in a graph.

In some implementations in which candidate test differences that are determined to likely not be meaningful are tagged but not omitted by the components of the testing service 110, the dashboard service 118 may provide for a variety of user interface controls to allow a dashboard service user to adjust the inclusion or omission of candidate test differences in reports or presentations generated by the reporting module 306. In some implementations, the presentation or formatting of the candidate test differences presented to the user may provide a visual distinction between the likely meaningful differences and likely not meaningful differences. Further, the presentation may have a combination of these features. More particularly, an adjustable threshold or other factor may be set for inclusion of likely not meaningful differences and a formatting or other visual distinction may be provided for those differences included based on the likelihood of the particular differences being meaningful. In a more concrete example, in an output report showing differences on a line by line basis, candidate test differences that are likely meaningful may be presented with black text highlighted in yellow and candidate test differences that are likely not meaningful may be presented as grey text without highlighting. Of course, these are merely examples of the utilization of the likelihood of candidate test differences being meaningful and many variations are possible.

The replay module 308 may operate in the manner discussed above to cause one or more of the logged intercepted requests 124 to be replayed. In some implementations, this is performed by requesting that the testing service 110 replay the intercepted requests 124, possibly with any desired changes in the setup. Though not illustrated in the figures, in some implementations, the replay module 308 may include a copy of the candidate stack 114, the authority stack 116, and/or a new/altered/different candidate stack or the replay module 308 may interact directly with the software system of one or more of these stacks or the production stack 108. In such an implementation, the replay module 308 may replay the intercepted requests 124 directly to the appropriate software system and/or make the appropriate analysis of the results. As discussed above, one example reason for replaying the intercepted requests 124 may be to determine if a changed candidate software system has reduced, eliminated, or exacerbated any unacceptable meaningful differences between the candidate response 134 and authority response 136. The results of the replay of the intercepted requests 124 would be passed, for example, to the reporting module 306 for preparation for presentation to the user via user interface module 312 (possibly after being analyzed by the comparator module 208, the metrics module 210, the logger module 212, and/or other similar modules).

As mentioned above, the testing control module 310 may operate to allow for configuration and/or control of the testing service 110 by, for example, a user of the dashboard service 118 interacting with the dashboard service 118 through the user interface module 312. An example control that may be performed by the control module 310 would be to configure comparator module 208 to tag differences in specific fields for audit and display purposes rather than all fields. Another example control that may be performed by the control module 310 would be to configure the intercept parameters of the interceptor 112 (e.g., the percentage of client requests to intercept, the maximum number of client requests to be intercepted in a given time period, types of client requests to intercept, etc.) Another example control that the control module 310 may provide to a user of the dashboard service 118 would be to provide an interface for configuring the candidate testing and the behavior of the various modules of the testing service 110 that result from different scenarios of such testing. For example, as discussed above, the testing service 110 may be configured to omit, filter, suppress or otherwise distinguish candidate test differences that do not appear to be caused by differences between the candidate and authority software systems or that are not meaningful. In some implementations, the control module 310 may be utilized to set thresholds, categorical treatments and/or other factors for determining what type of treatment a determined difference is to be given (e.g. omitted, included, partially included, visually set off, etc.) As indicated above, the user interface module 312 of the dashboard service 118 may present a user interface to dashboard service users to allow for interaction by the dashboard user with the testing service system.

As alluded to previously, through interaction with the dashboard service 118, a dashboard user is able to configure the duration of the testing, such as by configuring conditions upon which the interceptor 112 stops intercepting requests to the production system 106. Some types of conditions are described below.

One example condition for controlling the duration of the testing is a specified mix of use cases represented by the intercepted requests 124, such as a number m of first use case requests, a number n of second use case requests, and so on. Use cases of particular intercepted requests 124 could be determined by the tagging and/or classifying function of the comparator module 208 discussed above. In addition to using the mix of use cases to drive the duration of the testing, the dashboard service 118 could use the determined use cases to provide information on the distribution of use cases to the dashboard users via the reporting module 306 and user interface module 312. In some implementations, the use case reporting may be updated on a real-time basis as intercepted requests 124 are received by the testing service 110 and processed. Such use case information could be presented in a textual manner or in a visualization (such as a chart) for ease of comprehension. The determination of use cases and subsequent presentation of the distribution of the use cases represented by the intercepted requests 124 that have been processed may also be performed without the use of this information to control the duration of the testing.

Another example condition for controlling the duration of the testing is a measure of code coverage. For example, the testing service system could be configured to continue the testing until a defined percentage or other measurement of the code of the candidate stack 114 has been tested to a satisfactory degree. One example implementation to determine code coverage of an intercepted request would be to instrument code of the candidate stack 114 to be tested such that when a portion of the code is executed, it outputs an indication of its execution. Such instrumenting could be coded into the source code of the candidate software system but selectively compiled based on a flag during the compilation process. Thus, when a candidate software system is to be generated by the compiler for testing, the flag would be set and the code coverage instrumentation code would be compiled into the candidate software system. When the candidate software system is to be used as a production software system, the flag would not be set and the compiler would ignore the code coverage instrumentation code.

Further, the testing service system described herein may also be integrated with a source code control system of the software system being tested to allow for identification of code changes that resulted in deviance from expected results and/or to identify the code paths which map to the differences in responses between the candidate stack 114 and the authority stacks 116. For example, for a meaningful difference that occurs between a candidate software system and an authority software system that are versions of the same software system, a developer may be provided with information related to changes in the source code of the software system between the candidate software system and the authority software system and that are also associated with the generation of the logical location of the difference, if applicable.

Integration with the source code control system may also allow the testing service system to include an automatic source code rollback function for the candidate software system of the candidate stack 114. For example, based on threshold of meaningful unacceptable differences, latency increases or the like, the dashboard service 118, either through program logic or explicit user instruction, could instruct the source code control system to rollback changes to the source code of the candidate software system being tested. In addition to using the code coverage to drive the duration of the testing, the dashboard service 118 could use the determined code coverage to provide information on the code coverage to dashboard users via the reporting module 306 and the user interface module 312. As with the use case reporting, in some implementations, the code coverage reporting may be updated on a real-time basis as intercepted requests 124 are received by the testing service 110 and processed. Such code coverage information could be presented in a textual manner or in a visualization (such as a chart or graph) for ease of comprehension. Of course, the determination of code coverage and subsequent presentation thereof may be performed without the use of this information to control the duration of the testing.

In addition, the dashboard service 118 may provide a dashboard user with a user interface (e.g. via the user interface module 312) to cause the testing control module 310 to configure the testing service 110, the candidate stack 114 and the authority stacks 116 for a given test. For example, prior to executing a given test, the user may be able to configure the software systems, software system versions, end points, fleets, and the like to be used for the candidate stack 114 and/or authority stack(s) 116.

In a first particular example, the dashboard user may utilize the dashboard service 118 to select system resources to operate one or more of the candidate stack 114, the authority stack(s) 116, the interceptor 112 or other aspects of the system (e.g., one or more machines of a fleet of machines, one or more distributed computing resources available for provisioning, etc.). The dashboard user may then utilize the dashboard service 118 to select the software systems, software versions, end points, fleets, and the like to be used for the candidate stack 114 and/or authority stack(s) 116. Once system resources are selected and system parameters are input, the dashboard user may cause the dashboard service 118 to control the startup of the candidate stack 114, the authority stack 116 and/or other aspects of the testing service 110 based on the parameters selected by the dashboard user. In an example startup of the candidate stack 114, the user may select one or more machines included in available system resources, choose a particular candidate software system and cause the selected machines to be provisioned with the candidate software system (i.e., install the candidate software system on the machines and perform any other setup process(es) needed to provision the selected machines).

In a second particular example, the dashboard user may utilize the dashboard service 118 in the same manner to select the parameters for the testing service 110 except that the user may select system resources already provisioned with the software systems and the like to be utilized. In such a case, the user may be provided with user interface controls to select any endpoint that matches the parameters of the software systems indicated.

While the above discussion includes particular examples of controls that may be provided to the dashboard user by the dashboard service 118, implementations are not so limited and such details may vary from implementation to implementation. For example, in some implementations, the user may be provided with a combination of the particular examples of selecting parameters for the testing service 110. In a particular example, some implementations of the dashboard service 118 may provide functionality to select either or both pre-provisioned and unprovisioned system resources for utilization by the testing service 110. These and other variations would be apparent to one of ordinary skill in the art in view of this disclosure.

Figure 4:
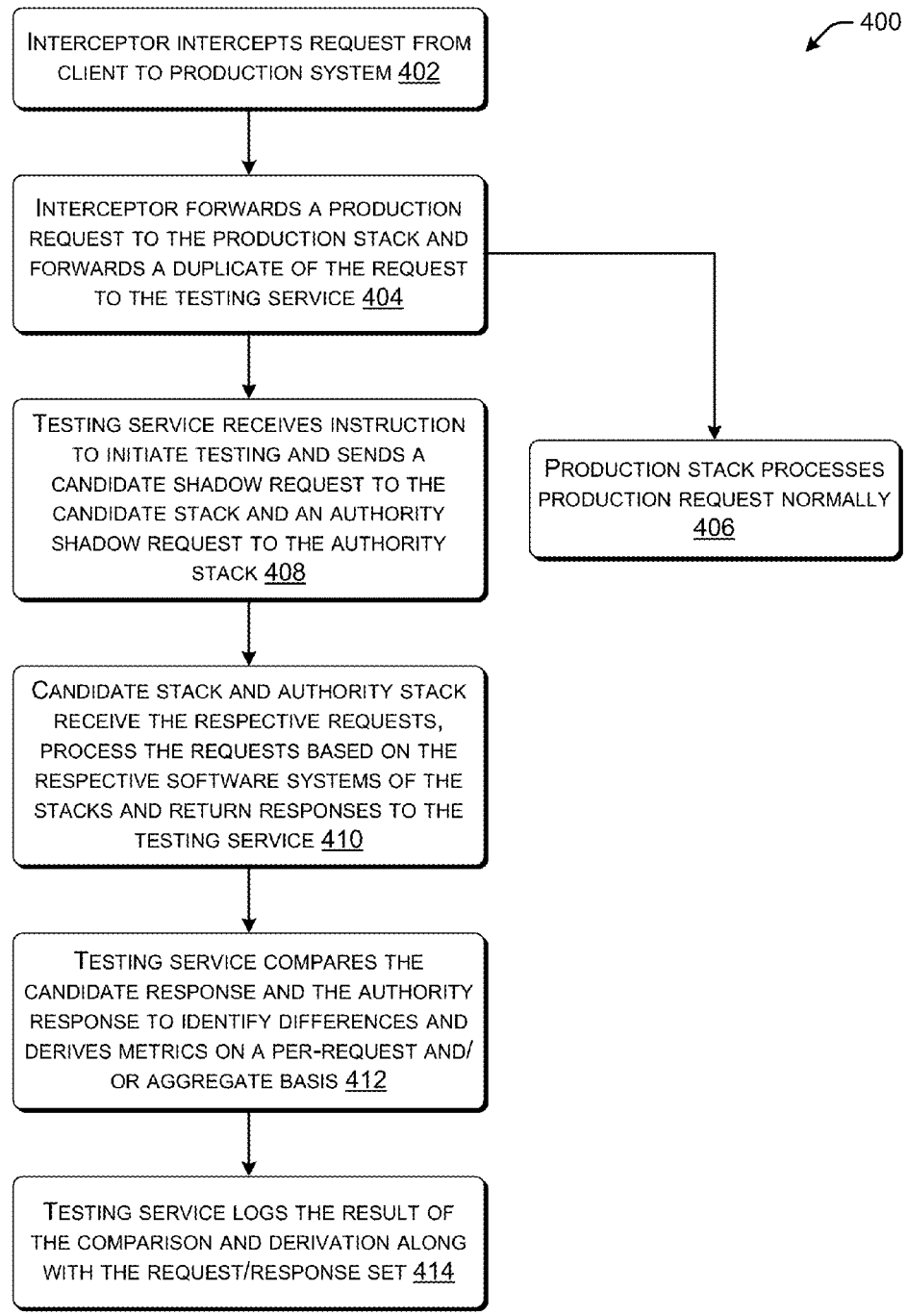
FIG. 4 is a flow diagram of an illustrative process to perform testing of an intercepted request to validate one or more software systems.

FIG. 4 is a flow diagram of an illustrative process 400 that provides for software testing of one or more software systems using intercepted requests as described above regarding FIGS. 1-3. Process 400 may be performed by the testing service 110 in conjunction with the production stack 108, candidate stack 110, authority stack 116 and the dashboard service 118. The process 400 (and other processes described herein) may be performed in other similar and/or different devices and/or in different environments. The process 400 is illustrated as a collection of blocks in a logical flow graph, which represent a sequence of operations that can be implemented in hardware, software, or a combination thereof. In the context of software, the blocks represent computer-executable instructions stored on one or more computer-readable storage media (e.g., machine readable storage media) that, when executed by one or more hardware processors, perform the recited operations. Generally, computer-executable instructions include routines, programs, objects, components, data structures, and the like that perform particular functions or implement particular abstract data types. Embodiments may be provided as a computer program product including a non-transitory computer-readable storage medium having stored thereon instructions (in compressed or uncompressed form) that may be used to program a computer (or other electronic device) to perform processes or methods described herein. The computer-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/computer-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by Internet download. As used herein, computer-readable storage media and machine readable storage media do not include transitory machine-readable signals or other transitory media. The order in which the operations are described is not intended to be construed as a limitation, and any number of the described blocks can be combined in any order and/or in parallel to implement the process. Other processes described throughout this disclosure (e.g. those illustrated in FIGS. 5, 7 and 8), in addition to process 400, shall be interpreted accordingly.

At 402, the interceptor 112 intercepts a client request 120 from the user 102 to the production system 106. At 404, the interceptor 112 forwards a production request 122 to the production stack 108 and forwards a duplicate of the request to the testing service 110 as an intercepted request 124. At 406, the production stack 108 processes the production request 122 normally such that a production response 126 is sent back to the user device 104 as a client response 128. In the implementation illustrated in FIG. 4, the interceptor 112 may optionally intercept and forward the production response to the testing service 110 as an intercepted response.

At 408, the testing service 110 receives an instruction to initiate testing and, based on the instruction, sends at least some of the intercepted requests 124 to the candidate stack 114 and authority stack 116 for processing as the candidate requests 130 and authority requests 132.

At 410, the candidate stack 114 and authority stack 116 receive the candidate requests 130 and authority requests 132, respectively. Then, the candidate stack 114 and authority stack 116 process the requests based on their respective software systems and return the candidate responses 134 and authority responses 136 to the testing service 110, respectively. As stated above regarding FIG. 1, in some implementations, the functions of the authority stack 116 may be fulfilled by the production system 106 and, more particularly, the software system operated by the production stack 108. Also, in some implementations, the candidate stack 114 and authority stack 116 may need to interact with devices outside of the testing service system, such as the production stack 108 or other production systems, in order to process the candidate requests 130 and authority requests 132. In such cases, the interactions with the outside devices may be marked as testing interactions to prevent the outside devices operating on the testing interactions as if the testing interactions were production interactions that modify the production system state and/or data. For example, in the case of "stateful" transactions, some implementations may support storing stateful data (e.g., transaction data), as "candidate transaction data" which will be ignored by production systems. The candidate transaction data may be written by the candidate stack 114, and the testing service 110 loads the candidate transaction data and compares it to "production transaction data" or "authority transaction data" after processing each intercepted request 124. Depending on the details of the implementation, "authority transaction data" may also be marked in a similar manner to "candidate transaction data."

Other implementations may provide support for stateless testing for transaction-based (i.e., stateful) services. For example, such implementations may provide hooks in the software system of the candidate stack 114 to avoid the side effect of storing data in a persistent data store. This may allow requests to be sent to the candidate stack without resulting in storage of transactional data.

At 412, the testing service 110 performs a candidate test using the candidate response 134 and authority response 136. Based on the results of the candidate test, the testing service 110 may determine or evaluate the candidate test difference for meaningfulness. Such a meaningfulness evaluation may provide the evaluation as a value on a scale (0-100), a true or false value scale or another manner of representing the result. The testing service 110 also analyzes the responses and, based on one or more candidate/authority and authority/authority response pairs, may derive metrics for the stacks on both a request by request basis and an aggregate basis.

At 414, the testing service 110 may log the results of the comparison and derivation analysis with the requests and responses (as well as any other data regarding the processing to this point, depending on the implementation). The testing service 110 may store the logged information in a variety of ways.

In some implementations, the logged intercepted requests and associated information may be stored in a searchable catalog organized in a hierarchical manner. For example, the following might be paths in the hierarchy:

NA→US→Company the retailer→digital items→address is in New York

NA→US→Company the retailer→movies→address is in California

NA→US→third party sellers→books→address is in Michigan

NA→CA→third party sellers→books→address is in Ontario

EU→UK→Company the retailer→music items→address is in London

EU→DE→Company the retailer→music items→address is in Berlin

For each node in the hierarchy, the testing service 110 may provide support to replay all or a subset of the intercepted requests under that node.

In some implementations, the stored logs provide support for an additional type of testing not explicitly mentioned above. In particular, using the stored logs including stored requests and responses, the testing service 110 may also provide support for regression testing. In other words, the testing service 110 may be capable of running a full regression suite from a node in the request/response catalog against a candidate software system by replaying the stored requests and comparing the candidate responses against the stored responses (e.g. production or authority responses). This way, a new candidate software system may be thoroughly regression tested using a large number of "realistic" production requests (as much as hundreds of thousands, millions or more). Such testing is based on the principle that the behavior in production (or the behavior of an authority version) may be presumed to be correct and therefore the stored responses can be used to qualify new candidate software systems, for example, prior to the testing described above with respect to FIGS. 1-4.

Another storage option is to create an index where each intercepted request is labeled with a unique ID. Such an index may resemble the following:

Company Seller of Record ID: request_01, request_02, . . .
 E-Book Item: request_04, request_02, . . .
 US Order International ship address: request_04

This second option allows for a single request to be mapped to multiple scenarios. To express the hierarchical paths in such an index, the testing service 110 could use set intersection. The generation of the request repository and generation of the meta-data index may be automated and regenerated from production requests. In some implementations, the repository generation process may continue until a specified index is "complete," meaning each entry in the index maps to at least one request or even that specific combinations of indexes exist, e.g. Non-Company SOR AND E-book. Such an index may provide for very specific use cases to be regression tested with limited numbers of other use cases being exercised. By utilizing this or another indexing scheme, some implementations may provide indexing based on the code coverage or use cases represented by the indexed requests. Thus, in some implementations, rather than testing one hundred thousand to ten million requests and relying on the assumption that the large number of previously tested requests provide the coverage needed, a smaller number of requests may be tested with a higher degree of certainty that the coverage is provided. Further, when a regression test fails, a user may immediately know what use case or code path failed.

In such a system, the use case information or code coverage information may be used to create a test case repository of test cases that map to sets of logged requests. Such test cases may be generated to be small sets of requests that exercise desired levels of code coverage (e.g., the smallest set of requests that give the desired code coverage). For example, in building a test case for a code coverage instrumented candidate stack, as each new request that may be added to the test case is processed, the testing service may determine if code not previously exercised by the test case request set is exercised by the new request. If so, the new request may be added to the test case request set. If not, the new request may not be added to the test case request set. In this way, the overall code coverage of the test case may be increased without substantial increase in the number of requests in the test case set. Depending on the implementation and the purpose of the test case, many variations are possible. For example, the determination as to whether a new request should be added to the test case may be based on how many requests in the test case set already exercise the code exercised by the new request. For example, for some code, the test case developer may desire multiple requests be processed. At the same time, for other code, the developer may desire two requests be added for the purpose of exercising the code.

In another variation, the system may determine the particular code exercised by the requests. This information may be stored with the request as a request signature. When building a test case, the system may add requests based on the number of requests with the same test signature already present in the test case set. For example, a developer may desire two requests be included for each test signature. Alternatively or additionally, the developer may desire that two requests be included for each test signature but for some set of indicated test signatures, a different number be included. Further, in such a system, the request may be indexed in a repository by the test signatures.

In some implementations, if the user knows the behavior of the software is going to change between the authority or production software system and the candidate software system, the user may be able to exempt use cases based on the meta-data affected by the behavior change. In addition or alternatively, some implementations may index the requests based on other criteria such as candidate test differences, latency differences, processing differences, amount or other measure of any candidate test difference (e.g. an absolute value, a ratio, a percentage, etc.). As such, the additional or alternative indexes may be utilized to provide requests that reflect such criteria.

Figure 5:
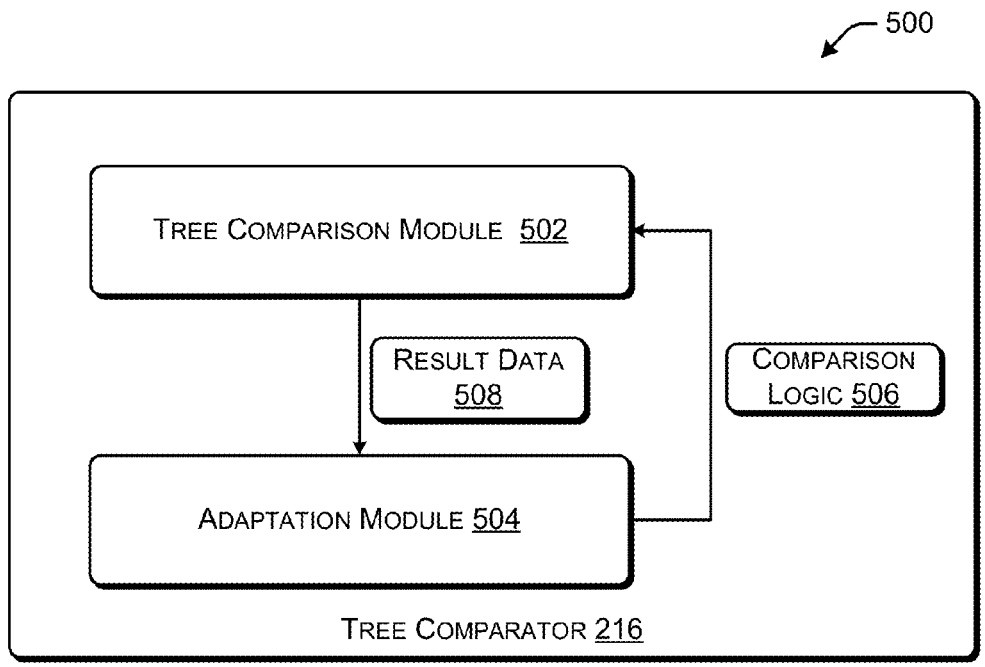
FIG. 5 is a logical diagram of an illustrative tree comparator to perform comparison of tree structures.

FIG. 5 is a schematic diagram 500 of an illustrative tree comparator 216 that provides for comparisons of tree structures. The tree comparator 216 of FIG. 5 includes a tree comparison module 502 and an adaptation module 504. In some implementations, such as that illustrated in FIG. 5, the tree comparison module 502 may utilize comparison logic 506 to perform various comparisons of two data structures, such as tree structures, and may determine whether the trees are different, how much the trees differ, what are the differences between the trees, and/or whether the detected differences are meaningful. The adaptation module 504 of the tree comparator 216 may utilize machine learning to adapt the comparison logic 506 of the tree comparison module 502 based on, for example, the result data 508 provided by the tree comparison module 502.

In general, the tree comparison module 502 may compare the trees presented to the module 502 using a matching algorithm. In addition, the tree comparison module 502 may include functionality to address the issues discussed above regarding FIG. 2. One example of such functionality was discussed above regarding FIG. 2 that addressed compound declarations of tags and attributes of nodes resulting in mismatches. As discussed above, in some implementations including such functionality, the tree comparison module 502 may be configurable to ignore attribute differences in tag statements or to otherwise address the issue. Some other example functionalities of the tree comparison module 502 are discussed below. In particular, example functionalities are provided below that address the second problem of different representations of the same value causing false mismatch, the third problem of differences in node ordering not being detected causing false mismatch and the fourth problem of missing nodes and/or extra nodes leading to sub-tree mismatch.

As mentioned above, another functionality of the tree comparison module 502 may operate to address the second example problem, different representations of the same value causing a false mismatch. An example of this problem is shown in Table 3:

TABLE 3

| | |
|---|---|
| <skillsMap> | <skillsMap> |
| <isCertified> | <isCertified> |
| <key>Yes</key> | <key>1</key> |
| </isCertified> | </ isCertified > |
| </skillsMap> | </skillsMap> |

In the above example, the Boolean values of the key nodes, "Yes" and "1", would normally be found to be a mismatch. Such a mismatch may be a false mismatch. This may be addressed in some implementations by defining, for each type of data that may have multiple representations, equivalence sets or precision levels. For example, Table 4 may provide such an equivalence set for Boolean values:

TABLE 4

| True | False |
|---|---|
| "1" (string) | "0" (string) |
| "Yes" (string) | "No" (string) |
| "Y" (string) | "N" (string) |

TABLE 4-continued

| True | False |
|---|---|
| "True" (string) | "False" (string) |
| 1 (integer) | 0 (integer) |
| T | F |

Thus, when two values are compared, rather than determining the values to be different if the values are not an exact match, the tree comparison module 502 may determine if the first value is in one or more equivalence sets. If so, the tree comparison module 502 may determine if the second value is also in an equivalence set that includes the first value. For example, with regard to the example comparison shown in Table 3, the tree comparison module 502 may determine that the value "Yes" in the "True" equivalence set. The tree comparison module 502 may then determine if "1" is also in that set. Since "1" is in the same set, the values are determined to be true.

A similar operation may be performed for values that may be represented with different levels of precision, such as Real numbers. For example, a string comparison of "4" and "4.0" will result in a mismatch that is likely false. Similarly, a developer or user may wish for values to be found to match, even if not exactly the same, if the values are equivalent to a particular level of precision. For example, in some implementations, the tree comparison module 502 may be configured or configurable to compare floating point numbers to three decimal points precision such that "99.7778" is matched to "99.7776" but not "99.7791."

In some implementations, the equivalence sets and/or precision levels may be configurable for each portion of a tree structure, such as for particular sub-trees, nodes, attributes, or the like. Thus, one portion may be compared to three levels of precision while another portion is compared to nine levels of precision.

Another functionality of the tree comparison module 502 may operate to address the third example problem, differences in node ordering not being detected thereby causing false mismatches. In particular, some implementations of the tree comparison module 502 may operate to detect certain data types, types of trees or types of subtrees and perform a matching operation based on the detected type. Two example types of trees or subtrees are "lists" and "maps" as discussed below.

A sub-tree of a node may be detected as a list if the immediate children of the node have the same tag. An example of a list is shown in Table 5.

TABLE 5

| List Example |
|---|
| <items> |
|   <item>a</item> |
|   <item>b</item> |
|   <item>c</item> |
| </items> |

In the example above, the node with tag "items" may be treated as a list because all the node's immediate children have the same tag name, "item". Once a list is detected in both of two trees that are being compared, a cross matching between the list items may be performed to determine whether the trees match. In this context, cross matching operates to determine matches between items in two unordered structures. Table 6 illustrates two lists to be matched.

TABLE 6

| Tree 1 | Tree 2 |
|---|---|
| <items><br>  <item>a</item><br>  <item>b</item><br>  <item>c</item><br></items> | <items><br>  <item>b</item><br>  <item>c</item><br>  <item>a</item><br></items> |

An exact matching algorithm would detect Tree 1 and Tree 2 as a mismatch upon comparing item "a" to item "b" (the first items in the respective lists). The list comparison operation on the other hand would compare each list item in Tree 1 to each list item in Tree 2 and find correspondence for the items in lists. Thus, the list comparison operation would determine Tree 1 and Tree 2 to match.

Maps, the other example type of sub-tree mention above, may be detected in a similar type of operation. A map is a list of "entries." A sub-tree of a node is defined as being of type "map" if the immediate children of the node have a common tag name and each of the immediate child elements has two immediate child elements. Each set of two "grandchildren" elements are pairs in which one element is treated as a key and the other element is treated as a value. An example map sub-tree is shown in Table 7.

TABLE 7

Map Example

<addressMap>
  <entry>
    <string>Marketplace</string>
    <Address>
      <country>GB</country>
    </Address>
  </entry>
  <entry>
    <string>Billing</string>
    <Address>
      <country>DE</country>
    </Address>
  </entry>
</addressMap>

In the example above, the node with tag "addressMap" would be detected as a map sub-tree because each immediate child of the "addressMap" node has the same tag, "entry" and each immediate child has two children (i.e., grandchildren of the "addressMap" node). The content of the map example of Table 7 could be represented in the simpler form shown in Table 8.

TABLE 8

Marketplace Country = GB
Billing Address Country = DE

Once a map is detected in both of two trees that are being compared, a map matching operation may be performed to determine whether the maps are a match. Table 9 illustrates two maps to be matched.

TABLE 9

| Tree 1 | Tree 2 |
|---|---|
| <addressMap><br>  <entry><br>    <string>Marketplace</string> | <addressMap><br>  <entry><br>    <string>Billing</string> |

TABLE 9-continued

| Tree 1 | Tree 2 |
|---|---|
|     <Address><br>      <country>GB</country><br>    </Address><br>  </entry><br>  <entry><br>    <string>Billing</string><br>    <Address><br>      <country>DE</country><br>    </Address><br>  </entry><br></addressMap> |     <Address><br>      <country>GB</country><br>    </Address><br>  </entry><br>  <entry><br>    <string>Marketplace</string><br>    <Address><br>      <country>DE</country><br>    </Address><br>  </entry><br></addressMap> |

A simple similarities algorithm would incorrectly detect Tree 1 and Tree 2 as a match because the same lines appear in both trees even though the content is not a match. Table 10 illustrates the map examples of Table 9 in a simpler form to illustrate the mismatch of content.

TABLE 10

| Tree 1 | Tree 2 |
|---|---|
| Marketplace Country = GB<br>Billing Address Country = DE | Marketplace Country = DE<br>Billing Address Country = GB |

As can be seen in Table 10, the "country" values are reversed. The example map matching algorithm described here operates to compare nodes/entries with the same keys. Thus, the entry with the key "billing" in Tree 1 is paired for comparison with the entry with the key "billing" in Tree 2. In view of this pairing, the trees are found to be a mismatch.

This is more efficient than the list matching operation described above because the tree comparison module 502 does not have to perform a cross match between the sub-trees of the entries and because comparisons of keys requires far fewer operations. Once matching entries (based on keys) are found, the sub-trees of the key-matched entries are compared. If the entries of each map are found to have corresponding matches in the other map, the maps may be determined to be a match.

Maps and lists are merely examples of data types that may have particular matching operations. Other data types or tree or sub-tree types may have particular matching operations as would be apparent to one of ordinary skill in the art in view of this disclosure. An example of another data type that may have a particular matching process is shown in Table 11 below. In particular, the data type shown in Table 11 is similar to the map data type but uses tags of the entries as keys to identify the value rather than the key node and value node pair representation discussed above.

TABLE 11

| Tree 1 | Tree 2 |
|---|---|
| <Items><br>  <Item><br>    <Name>ProductX</Name><br>    <Taxable>True</Taxable><br>    <Cost>100.00</Cost><br>  </Item><br>  <Item><br>    <Name>ProductY</Name><br>    <Taxable>True</Taxable><br>    <Cost>75.00</Cost><br>  </Item><br></Items> | <Items><br>  <Item><br>    <Name>ProductX</Name><br>    <Taxable>0</Taxable><br>    <Cost>100.00</Cost><br>  </Item><br>  <Item><br>    <Name>ProductY</Name><br>    <Taxable>1</Taxable><br>    <Cost>75.00</Cost><br>  </Item><br></Items> |

In an example detection and matching process for the sub-tree type shown in Table 11, the process may detect a list of items in each tree at the high level on a "first pass." On the next pass, the process may determine that the list items include child nodes with no repeating tags. Based on this information, the process may determine that the tags may be used as keys to pair various portions of the items for comparison. For example, the process may use the tags as keys to pair the nodes based on tag matches across the sub-trees of the responses similar to the use of key nodes in the discussion of FIG. 8.

Another functionality of the tree comparison module 502 may operate to address the fourth example problem discussed above, missing nodes and/or extra nodes leading to sub-tree mismatch. Some examples of this problem occur in lists. For example, the problem may occur when one of two lists being compared has an extra node or when each of two lists being compared has a node that does not appear in the other list. Two example techniques for addressing this issue are discussed below.

In the first example technique, a similarity function may be defined that matches nodes to provide a best match. The similarity function may be defined to maximize similarity. This technique may be implemented in a similar manner to solutions of the stable marriage problem. Of the two example techniques for addressing this problem discussed herein, this technique has higher runtime complexity but may provide more information.

In the second technique, ignored nodes or fields may be defined to avoid differences caused by extra and/or missing nodes or fields. For example, in a testing system such as that shown in FIG. 1, when it is known that one or more new fields have been added to a response, that one or more old fields have been removed from the response or both, the field(s) may be defined as an ignored field to eliminate meaningless differences in the candidate test differences and to achieve a lower runtime complexity. An example of this technique may be seen with respect to the example trees of Table 12.

TABLE 12

| Tree 1 | Tree 2 |
|---|---|
| <items> | <items> |
| <item>a</item> | <item>b</item> |
| <item>b</item> | <item>c</item> |
| <item>c</item> | <item>d</item> |
| </items> | </items> |

Using the above discussed list matching technique, Tree 1 and Tree 2 will be determined as a mismatched. However, in a candidate test scenario in which the user knows that item "a" has been removed and item "d" has been added, this mismatch is an expected result and inclusion of these differences in the candidate test differences may not be desired. Thus, items "a" and "d" may be defined as ignored fields to remove the differences.

The above described functionalities of the tree comparison module 502 are not limiting. Other functionalities and/or variations of the above defined functions would be apparent to one of ordinary skill in the art in view of this disclosure.

In some implementations, the tree comparison module 502 may operate to pair nodes for comparison differently using a plurality of modes depending on the types of elements being compared. For example, in a first mode, the elements may be paired for comparison using a relatively low complexity technique, such as a pairing technique based on tags. In a second mode, the elements may be paired for comparison using a relatively more complex technique, such as a pairing technique based on tags, structure, content and ignored fields. Some implementations may pair simple elements using the first mode and pair more complex elements using the second mode. To determine which mode should be used for a given element, some implementations build knowledge about the structure of the trees being compared prior to the comparison.

Alternatively or in addition to using different modes for pairing items for comparison, some implementations may be configured to or configurable to cap the level of depth into a tree that is considered when pairing the nodes of the tree for comparison. Similarly, some implementations may be configured to or configurable to cap the level of depth into a tree that is compared when matching nodes. In some implementations, the tree comparison module 502 may operate to allow the level of depth cap to be set and/or adjusted. For example, the level of depth cap may be changeable depending on the portion of the tree or based on detected structure or content of the portion of the tree.

Moreover, the tree comparison module 502 may perform operations for different portions or levels of depth at adjustable rates. For example, the tree comparison module 502 may be configurable by a user to compare or pair nodes of the tree structures using five levels of depth for four of five pairs of trees and to compare or pair nodes using ten levels of depth for the fifth pair of trees. Further, the tree comparator module 502 may be configurable to compare a first portion of the trees for two out of five pairs, a second portion for three of five pairs and the remainder of the tree for every pair. These are merely examples and many variations would be apparent in view of this disclosure.

The adaptation module 504 may utilize information obtained from the user and the results of the tree comparisons as training data to adapt the comparison logic utilized by the tree comparison module 502 to perform tree comparisons (with the goal of improving the accuracy and/or usefulness of the tree comparisons). Some example adaptations may include adapting the level of depth cap(s), adapting the complexity levels for applying different modes for pairing nodes for comparison, developing logic for comparing types of structures within trees, adapting the rates at which different portions or depths are compared, and so on. For example, if a portion has consistently included no differences, the adaptation module 502 may adjust the rate of comparison for the portion down. Similarly, if that portion subsequently includes differences, the tree comparison module 502 may operate to increase the rate of comparison for that portion.

Another example adaptation may occur where very few differences are being found in a depth capped comparison operation. After a period of time without or with few differences, the adaptation module 504 may increase the depth cap until differences are found. Similarly, if the increase in depth of comparison does not result in additional a higher rate of differences being found, the adaptation module may reduce the depth cap for the portion to reduce the cost of the comparison operations.

Another example adaptation may occur when many differences are being found in where the level of depth for pairing nodes for comparison is capped. For example, if the level of depth is to low when operating to pair nodes of a map, the pairing would be based at the most depth on the tag, <entry>, which is not greatly informative. As such, entries with different keys may be paired for comparison. Thus, in some implementations, the adaptation module 504 may increase the level of depth used for pairing nodes for comparison when large numbers of mismatches are detected.

The adaptations discussed above are not intended to be limiting. As one of ordinary skill in the art would understand in view of this disclosure, many variations and alternative adaptations are possible.

Figure 6:
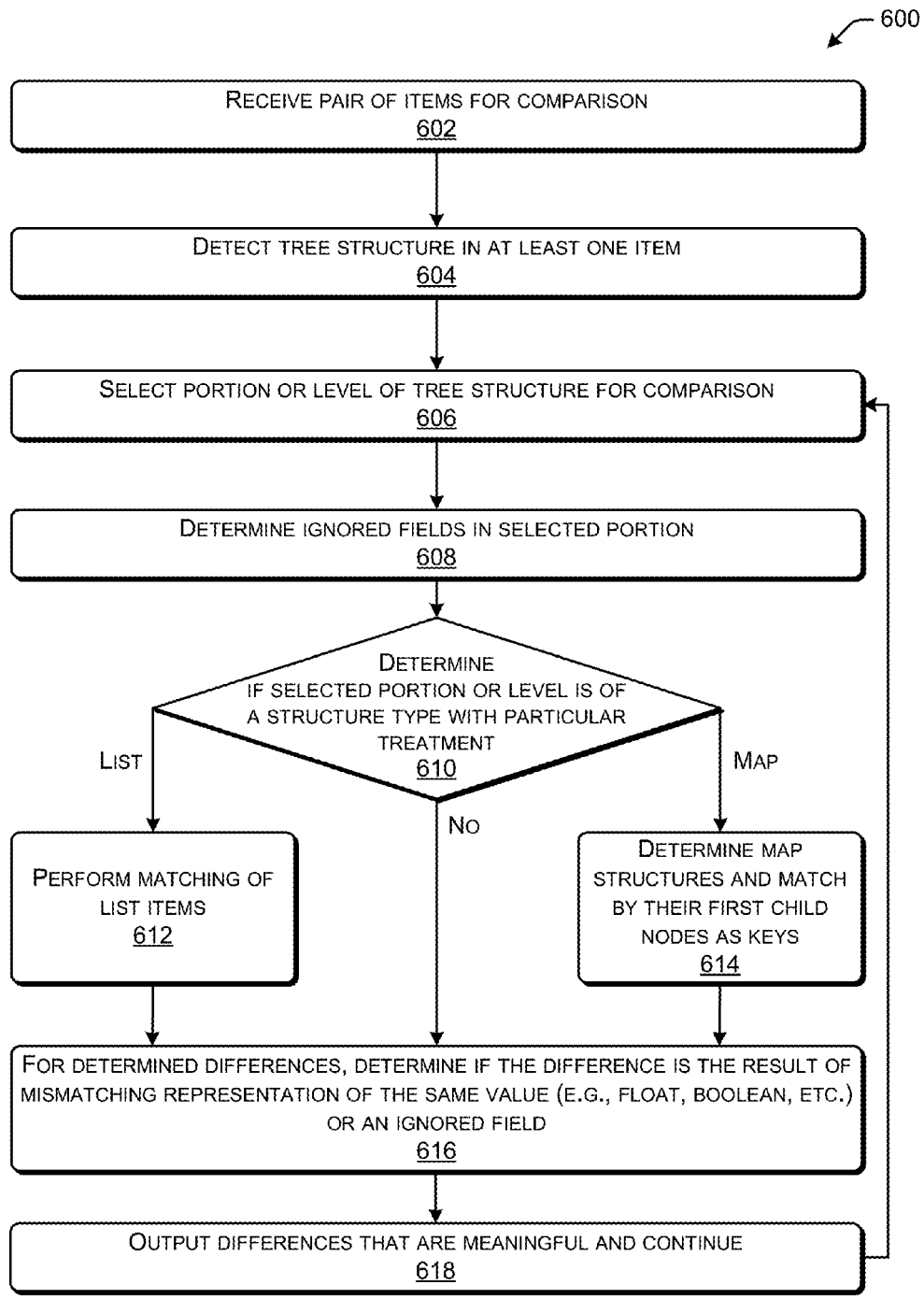
FIG. 6 is a flow diagram of an illustrative process to compare tree structures.

FIG. 6 is a flow diagram of an illustrative process 600 that provides for comparison of tree structures. In particular, process 600 illustrates an example process flow showing the operations of the tree comparison module 502 as described above with regard to FIG. 5 to compare tree structures.

At 602, the tree comparison module 502 receives a pair of items for comparison. For example, the items for comparison may be candidate and authority responses, items for comparison in a lookup or matching operation, etc. At 604, the tree comparison module 502 operates to detect tree structures in at least one of the items.

At 606, the tree comparison module 502 selects a portion or level of tree structure for comparison. For example, the tree comparison module 502 may begin by recursively performing a comparison operation until the level of depth of a cap is reached. At 608, once the portion or level for comparison is selected, the tree comparison module 502 may operate to determine if ignored fields are present in the selected portion or level. If so, the ignored fields are removed from the comparison operation or otherwise not considered in the comparison operations.

At 610, the tree comparison module 502 determines if the selected portion or level is of a structure type with a particular comparison treatment or process. For example, the tree comparison module 502 may operate to detect if the selected portion is a list or a map as described above regarding FIG. 5. If a list is detected, the process continues to 612. If a map is detected, the process continues to 614. Otherwise, the process continues to 614.

At 612, the tree comparison module 502 performs a matching of the list items as discussed above regarding FIG. 5. For example, cross matching may be used to match unordered list items. At 614, the tree comparison module 502 determines the map structures and matches the structures by the keys (i.e., the first child nodes of the immediate children of the map root nodes).

At 616, for each determined difference, the tree comparison module 502 determines if the difference is the result of a difference in representation of the same value (e.g., a float, a Boolean, etc.) or an ignored field. If a difference is the result of difference in representation or an ignored field, the difference is removed from the differences report or otherwise ignored.

At 618, the differences that remain may be meaningful and are output or added to a difference report and the process returns to 606 until no portion or level of the tree remains for comparison.

The process illustrated in FIG. 6 is merely an example and is not intended to be limiting. As one of ordinary skill in the art would understand in view of this disclosure, many variations and alternative processes are possible.

Figure 7:
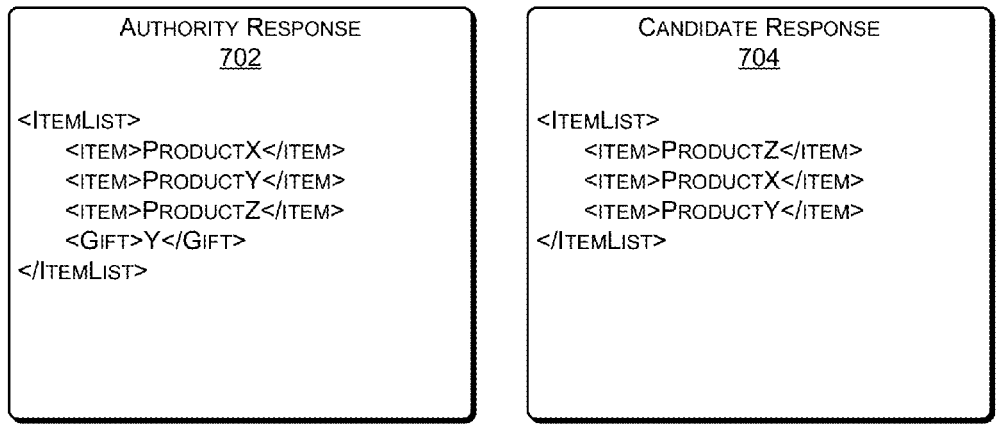
FIG. 7 is a diagram of a pair of responses with tree structures to be compared.

FIG. 7 illustrates an illustrative pair 700 of an authority response 702 and a candidate response 704. The pair 700 of responses shown in FIG. 7 is presented herein to illustrate the process through which a list is detected and ignored fields are removed from consideration.

In an example scenario for FIG. 7, in the authority system, a Boolean appears in the "ItemList" list that indicates whether the items in the list are gifts. In the candidate system, this Boolean value has been removed. Prior to performing the candidate test, the developer may add the "Gift" field to the ignored fields list for the comparison. Because, once the "Gift" field is removed from consideration, all of the items in the "ItemList" of the authority response have the same tag, "item," the tree comparison module 502 detects the sub-tree as a list. Upon performing a similar operation for the candidate response 704, a list of items is also detected. The tree comparison module 502 then performs the cross matching operation of the list items discussed above to determine if the pair 700 of responses match.

FIG. 8 illustrates a diagram of another illustrative pair 800 of an authority response 802 and a candidate response 804. The pair 800 of responses shown in FIG. 8 is presented herein to illustrate the process through which a list of maps may be detected and mismatched representations may be compensated for.

In particular, in analyzing the structure of the authority response 802, the tree comparison module 502 determines that each immediate child node of the "items" node has an "item" tag to detect that the "items" node is a list. In examining each "item" node of the "items" list, the tree comparison module 502 may note that each child of the nodes with the "item" tags has the same tag, "entry," and each entry node includes two immediate children. As such, the "item" nodes are determined to be maps. After a similar operation is performed on the candidate response 804, the candidate response 804 is determined to include a list of maps similar to that of the authority response 802.

The tree comparison module 502 may then perform a cross matching operation of the list items as discussed above to determine if the pair 700 of responses match. In performing this cross matching operation, the tree comparison module 502 may utilize the key-based matching discussed above with respect to FIG. 5 to compare the map nodes with the "item" tag. For example, the first entry of the first item of each response has a "name" tag. As such, the second children of these entries are compared and a mismatch is found. The process is repeated with respect to the first "item" of the authority response 802 and the second "item" in the candidate response 804. The first entry of this item pair is a match. The "taxable" entries of the items are then compared and determined to be a match based on reference to a Boolean equivalence set such as that discussed above with regard to FIG. 5. Similarly, the "cost" entries of the items are compared and determined to be different representations of the same numeric value. Thus, the first item of the authority response 802 and the second item of the candidate response 804 are determined to be a match. After repeating this operation with regard to the second item of the authority response 802 and the first item of the candidate response 804, another match is found and the response pair 800 is determined to be a match. However, after determining the second item of the authority response 802 and the first item of the candidate response 804 to be matching items, the comparison of the "taxable" entries finds a difference that is not accounted for by the Boolean equivalence set. In particular, the authority response 802 indicates ProductY is taxable but the candidate response 804 indicates that ProductY is not taxable. This difference may be output as a meaningful difference or may be subsequently eliminated as an ignored difference (e.g., if ProductY's tax treatment has been intentionally changed between the authority and candidate software systems).

Of course, the functionality described with regard to FIG. 8 may be applied to different items and is not limited to candidate and authority responses. Other applications and/or variations of the above defined functions would be apparent to one of ordinary skill in the art in view of this disclosure.

Figure 9:
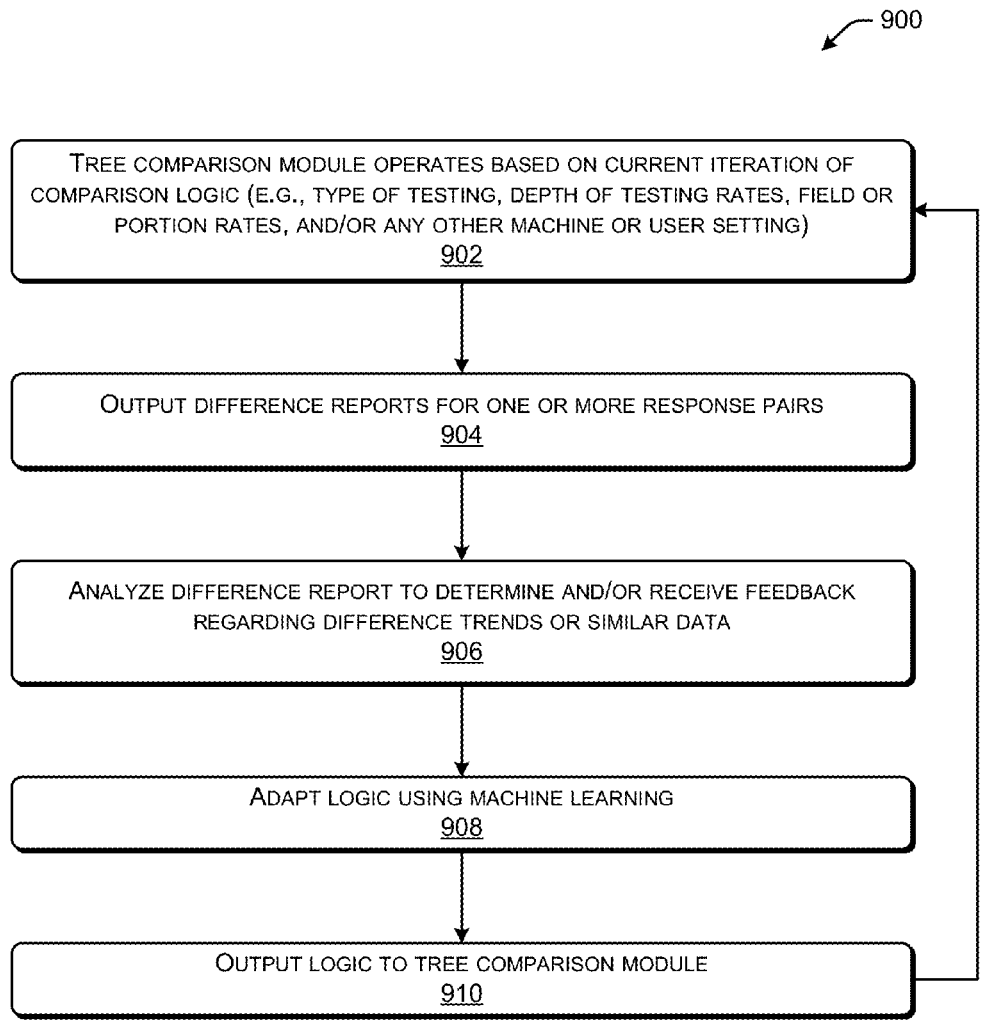
FIG. 9 is a flow diagram of an illustrative process to develop and/or adapt comparison logic for comparing tree structures.

FIG. 9 is a flow diagram of an illustrative process 900 that provides for development of comparison logic for comparison of tree structures as described above with regard to FIG. 5 and may be performed by the tree comparison module 502 and the adaptation module 504. In particular, process 900 illustrates an example process flow showing the operations of the adaptation module 504, from the tree comparison module 502 performing comparisons based on a current iteration of the comparison logic to the adaptation module 504 providing the next iteration of the comparison logic to the tree comparison module 502.

At 902, the tree comparison module 502 of the testing service may operate based on the current iteration of the comparison logic (e.g., the current parameters for the type of testing, level of depth for pairing, rates of testing for fields or portions, and/or any other machine or user setting). The resulting difference report(s) generated at 902 are output normally and received at 904.

At 906, after one or more difference reports have been generated and output, the adaptation module 504 may operate to analyze the one or more difference reports to determine difference trends, comparison cost data or similar data and/or may also receive user feedback of a similar nature. For example, the adaptation module 504 may determine that much processing time is being spent performing a deep comparison of a portion of the responses that has not had a difference in some period. In another example determination, differences may be determined to have occurred in a portion that is compared for only some fraction of response pairs due to a historical lack of differences. Moreover, a user or developer may indicate that significant changes have been made in the portion of the candidate software system that generates a particular portion of the responses.

At 908, in view of the analysis of the difference reports and/or the feedback, the adaptation module 504 may adapt the comparison logic of the tree comparison module 502, such as by changing the parameters of comparison of the response pairs. For example, the information may be used as training data to adapt the comparison logic using machine learning.

At 910, the adaptation module 504 may output the adapted comparison logic to the tree comparison module 502. In turn, the tree comparison module 502 may begin using the adapted comparison logic in future comparisons of response pairs.

This disclosure provides various example implementations, as described and as illustrated in the drawings. However, this disclosure is not limited to the implementations described and illustrated herein, but can extend to other implementations, as would be known or as would become known to those skilled in the art in view of this disclosure. For example, in some implementations, the tree comparison techniques described herein may be utilized in systems of than the testing service described above. Some examples applications are discussed below.

A first example application of the tree comparison techniques described herein is to find reverse matches. This has broad application in various use cases for eliminating choices, i.e., for use in matching algorithms where a user wants to find strong reasons to eliminate items from consideration when performing reverse matching. This is the reverse of the normal matching algorithms which, for example, seek to find similar items such as friends a user may want to connect to, candidates a user may want to hire or products a user may want to purchase. Instead, this application of the techniques disclosed herein takes the opposite approach to, for example, find persons the user would not want to connect with or candidates the user would not want to hire or products the user would not want to buy. In particular, by performing the tree comparison techniques disclosed herein, many differences may be found as opposed to the exact matching techniques typically used which would merely stop comparing at the first difference. If the differences found for a possible friend are similar to differences found in other persons a user has chosen to not make friends, the possible friend may be eliminated from consideration.

In a similar application of the disclosed techniques, a service (e.g., the testing service, a dating service, a recommendation service, social networking service, search service, etc.) may operate to see if differences outweigh similarities between two items. As stated above, by performing the tree comparison techniques disclosed herein, many differences may be found as opposed to the exact matching techniques typically used which would merely stop comparing at the first difference. This may allow some implementations to take differences into account when finding similarities. If the number of differences outweighs the number of similarities, then the two items may not be considered similar. An example scenario for this application may be shown with regard to FIG. 10.

FIG. 10 illustrates a diagram of another illustrative pair 1000 of tree structures for comparison. The pair 1000 shown in FIG. 10 is presented herein to illustrate the process through which a service may operate to determine if differences (or non-matches) outweigh similarities (or matches) in tree structures. In particular, FIG. 10 illustrates an example of using the tree comparison techniques disclosed herein in the context of hiring an employee for a job opening, and more particularly, to determine if differences outweigh similarities between a potential hire 1002 and an ideal hire 1004.

In the illustrated example, the tree structure of the potential hire includes various characteristics of the hire divided into two maps, one for job history and education, the other for ratings provided by an interviewer for the candidate. The tree structure for the ideal hire includes similar entries but for most such entries, includes ranges of values within which an ideal hire would fall. In some implementations, no particular characteristic may be sufficient to disqualify a potential hire and, as such, evaluation of potential hires on all of the characteristics may be necessary. Of course, this is not a limitation and, in other implementations, a mismatch of some or any of the characteristics may be sufficient to disqualify a potential hire. Turning to the illustrated example, the potential hire matches each characteristic with two exceptions, infield and ownership. In the illustrated example, "infield" is the amount of time the potential hire has worked in the pertinent field and the "ownership" characteristic is the interviewer's evaluation of the potential hire's willingness and/or ability to take ownership of tasks or projects to which the potential hire is assigned. Depending on the implementation, the "infield" difference may be ignored in view of the matches of the other characteristics and the small degree of the difference. However, in the same or other implementations, the failure to match the "ownership" characteristic may be treated as a disqualifying mismatch. On the other hand, the matching of each of the other characteristics may be sufficient to override the "ownership" mismatch. These and other variations on the usage of the tree comparison techniques disclosed herein to determine if differences outweigh similarities between tree structures would be apparent to one of ordinary skill in the art in view of this disclosure.

A further application may allow a service (e.g., the testing service, a dating service, a recommendation service, social networking service, search service, etc.) to find and use hidden similarities. As described above, the tree matching algorithm can find similarities that the exact matching algorithm might otherwise ignore. So, for example, if an age node differs between items (i.e., people), but the astrological sign, which is a descendent of the age node, is the same, then the two people may be close enough to be considered similar. Similarly, the tree comparison techniques disclosed herein may be utilized to de-duplicate a catalog. In particular, catalogs in e-commerce are susceptible to duplicate listings when multiple sellers list items in the catalogs. A first seller and a second seller may list the same item with similar but distinct product information and descriptions. As a result the item has duplicate listings. The tree comparison techniques and systems herein may be utilized to detect such duplicate listings that are "similar enough" to be likely duplicates, even when a high level node (e.g., the product name or title) is different. Once such suspected duplicates are located, some implementations may provide the suspected duplicates to a user who may in turn review the suspected duplicates. If the user agrees that the items are duplicates, the user may cause the items to be merged. Example tree structures that illustrate a usage of the tree comparison techniques disclosed herein for de-duplicating is illustrated in FIG. 11.

FIG. 11 illustrates a diagram of another illustrative pair 1100 of tree structures for comparison. The pair 1100 shown in FIG. 10 is presented herein to illustrate the process through which a service may operate to determine if tree structures are a match based on hidden similarities that would normally be missed by an exact matching algorithm. In particular, FIG. 11 illustrates an example of using the tree comparison techniques disclosed herein in the context of determining if catalog items that have differences are actually duplicate listings of the same item. In the illustrated example, the pair 1100 includes a tree structure for a product X 1102 and a tree structure for a product Y 1104.

In the illustrated example, the tree structures of product X 1102 and product Y 1104 include various entries of the products similar to those of the tree structures of FIG. 8. In the illustrated example, most of the entries do not match between the tree structures 1102 and 1104 with the exception of a matching UPC or "Universal Product Code." As such, an exact matching algorithm would indicate that the products are not duplicate listings since at least one entry is a mismatch. However, using the tree comparison techniques disclosed herein, the "hidden" match of the UPC entry may be ascertained, which is a strong indication that either the listings are duplicates that are presented differently or that there is an error in the UPC of one of the products. For example, the tree structure comparison techniques disclosed herein may operate to determine the tree structures 1102 and 1104 to include map structures and compare the entries of the maps based on the key values (the first child of each entry). When the match of the UPC entries is ascertained, the pair may be flagged for review. The listings may be reviewed and, if the reviewer finds the listings to be duplicates, one listing may be removed or the listings may be merged. These and other variations on the usage of the tree comparison techniques disclosed herein to determine similarities that the exact matching algorithm might otherwise ignore would be apparent to one of ordinary skill in the art in view of this disclosure.

A still further application of the disclosed techniques may be to find dissimilar items. A typical approach for finding similarities is "people who bought this item also bought the following items." Using the disclosed techniques, the tree comparison module 502 may extend the concept of reverse matching above by showing "people who did not like this item also did not like that item."

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A testing system, comprising:
   at least one computing device including a hardware processor configured to implement a plurality of services including:
   an interceptor service configured to perform an intercept of a request to a production system; and
   a testing service configured to process the intercepted request by:
      causing a candidate request to be processed by a candidate system operating a candidate software system to be validated;
      causing a control request to be processed by a control system operating a control software systems that is used for validating the candidate software system, wherein the candidate request and the corresponding control request are based at least in part on the intercepted request;
      receiving, in response to the candidate request, a candidate response from the candidate software system;
      receiving, in response to the corresponding control request, a control response from the control software system; and
      comparing a candidate tree structure of the candidate response to a corresponding control tree structure of the control response to obtain one or more candidate test differences, the comparing comprising:
         detecting a complexity of a sub-tree structure of the candidate tree structure or a complexity of a sub-tree structure of the corresponding control tree structure;
         pairing nodes of the sub-tree structure of the candidate tree structure with nodes of the sub-tree structure of the corresponding control tree structure using tags of the nodes of the candidate tree structure and tags of the nodes of the corresponding control tree structure if the detected complexity is lower than a threshold; and
         if the detected complexity is greater than the threshold:
            pairing nodes of the sub-tree structure of the candidate tree structure with nodes of the sub-tree structure of the corresponding control tree structure using structural information of the sub-tree structure of the candidate tree structure and structural information of the sub-tree structure of the corresponding control tree structure and using content of the nodes of the sub-tree structure of the candidate tree structure and content of the nodes of the sub-tree structure of the corresponding control tree structure; and
            determining if the sub-tree structure of the candidate tree structure is of a type of sub-tree structure for which a corresponding matching process is defined; and performing the corresponding matching process to compare the sub-tree structure of the candidate tree structure with the sub-tree structure of the corresponding control tree structure.

2. The testing system as recited in claim 1, wherein the type of sub-tree structure for which the corresponding matching process is defined is a list, a list being a type of sub-tree structure in which immediate children of a head node of the list are of a same type, the corresponding matching process for the list being a cross matching operation; or type of sub-tree structure for which the corresponding matching process is defined is a map, a map being a type of sub-tree structure in which immediate children of a head node of the map are of a same type and in which the immediate children of the head node have two children which are grandchildren nodes of the head node, a first grandchild of at least one immediate child node being a key node and a second grandchild of the at least one immediate child node being a value node, the corresponding matching process for the map using key nodes to pair the immediate children of the head nodes of sub-tree structures being compared for comparison.

3. The testing system as recited in claim 1, wherein at least one node of the candidate tree structure or the corresponding control tree structure includes both a tag and one or more attributes; and at least part of the comparing being performed without considering at least one difference based on the presence of the one or more attributes of the at least one node.

4. The testing system as recited in claim 1, the comparing further comprising:

determining if a difference between the candidate tree structure and the corresponding control tree structure is due to a difference in representation of a value, the determining if the difference is due to the difference in representation of the value being based on an equivalence set of representations of the value; and the comparing being performed without considering at least one difference determined to be due to the difference in representation of the value.

5. The testing system as recited in claim 1, the comparing further comprising:

receiving identification of one or more fields to be ignored during the comparing;

determining the presence of one or more of the ignored fields in at least one of the candidate tree structure or the corresponding control tree structure; and if one or more of the ignored fields are determined to be present in at least one of the candidate tree structure or the corresponding control tree structure, the comparing being performed without considering at least one difference due to the presence of the one or more ignored fields.

6. A computer-implemented method comprising:

comparing, by one or more computing devices operating a testing service, at least a first software response and a second software response, the first software response including a first tree structure and the second software response including a second tree structure, the comparing comprising:

receiving identification of one or more non-comparison fields to be ignored during the comparing;

detecting a type of sub-tree structure in the first tree structure and a corresponding sub-tree structure in the second tree structure, the detected type of sub-tree structure being one of one or more types of sub-tree structures for which corresponding matching processes are defined;

determining the presence of one or more of the non-comparison fields to be ignored fields in at least one of the first tree structure and the second tree structure; and performing the corresponding matching process of the detected type of sub-tree structure for the sub-tree structure in the first tree structure and the corresponding sub-tree structure in the second tree structure without considering at least one difference due to the presence of the one or more non-comparison fields.

7. The computer-implemented method as recited in claim 6, wherein the detected type of sub-tree structure for which the corresponding matching process is defined is a list, a list being a type of sub-tree structure in which immediate children of a head node of the list are of a same type, the corresponding matching process for the list being a cross matching operation.

8. The computer-implemented method as recited in claim 6, wherein the detected type of sub-tree structure for which the corresponding matching process is defined is a map, a map being a type of sub-tree structure in which immediate children of a head node of the map are of a same type and in which the immediate children of the head node have two children which are grandchildren nodes of the head node, a first grandchild of at least one immediate child node being a key node and a second grandchild of the at least one immediate child node being a value node, the corresponding matching process for the map using key nodes to pair the immediate children of the head nodes of sub-tree structures being compared for comparison.

9. The computer-implemented method as recited in claim 6, the comparing further comprising:

determining if a difference between the first software response and the second software response is due to a difference in representation of a value; and the comparing being performed without considering at least one difference determined to be due to the difference in representation of the value.

10. The computer-implemented method as recited in claim 9, wherein the determining if the difference between the first software response and the second software response is due to the difference in representation of the value is based on an equivalence set of representations of the value.

11. The computer-implemented method as recited in claim 6, the comparing further comprising:

determining if a difference between the first software response and the second software response is due to a difference in representation of a numeric value; and the comparing being performed without considering at least one difference determined to be due to the difference in representation of the numeric value.

12. The computer-implemented method as recited in claim 11, wherein the determining if the difference between the first software response and the second software response is due to the difference in representation of the numeric value determines if the numeric value is the same to a level of precision.

13. The computer-implemented method as recited in claim 6, wherein the comparison is defined by one or more definitions specified in an extensible modeling language.

14. The computer-implemented method as recited in claim 6, wherein at least one node of one of the first tree structure or the second tree structure includes both a tag and one or more attributes; and
   at least part of the comparing being performed without considering at least one difference based on the presence of the one or more attributes of the at least one node.

15. The computer-implemented method as recited in claim 6, wherein the first tree structure and the second tree structure are initially in a serialization format.

16. The computer-implemented method as recited in claim 15, wherein the serialization format is one of Extensible Markup Language, YAML or JavaScript Object Notation.

17. One or more non-transitory computer-readable storage media storing computer-executable instructions executable in at least one computing device operating a testing service, comprising:
   instructions for comparing, based on a current iteration of a comparison logic, a first software and a second software, the first software including a first tree structure and the second software including a second tree structure, the first tree structure and the second tree structure including nodes having tags, the comparing comprising:
      instructions for detecting a complexity of a sub-tree structure of the first tree structure or a complexity of a sub-tree structure of the second tree structure;
      instructions for pairing nodes of the sub-tree structure of the first tree structure with nodes of the sub-tree structure of the second tree structure using tags of the nodes of the first tree structure and tags of the nodes of the second tree structure if the detected complexity is lower than a threshold; and
      instructions for pairing nodes of the sub-tree structure of the first tree structure with nodes of the sub-tree structure of the second structure using structural information of the sub-tree structure of the first tree structure and structural information of the sub-tree structure of the second tree structure and using content of the nodes of the sub-tree structure of the first tree structure and content of the nodes of the sub-tree structure of the second structure if the detected complexity is greater than the threshold.

18. The one or more non-transitory computer-readable media as recited in claim 17, wherein the instructions for pairing nodes of the sub-tree structure of the first tree structure with nodes of the sub-tree structure of the second structure using structural information of the sub-tree structure of the first tree structure and structural information of the sub-tree structure of the second tree structure and using content of the nodes of the sub-tree structure of the first tree structure and content of the nodes of the sub-tree structure of the second structure operates to pair nodes based on structure and content of the nodes above a defined level of depth in the first tree structure and the second tree structure.

19. The one or more non-transitory computer-readable media as recited in claim 17, wherein comparing is based at least in a part on a current iteration of a comparison logic, further comprising:
   instructions for adapting the comparisons logic based at least in part on results of one or more comparisons of one or more first software with one or more second software to generate an adapted iteration of the comparison logic, wherein the adapted iteration of the comparison logic is used in a subsequent comparison of a different first software and a different second software.

20. The one or more non-transitory computer-readable media as recited in claim 19, wherein the adapting modifies one or more of:
   a mode of comparing;
   a level of depth for the pairing nodes for comparison; or
   a rate of comparing for one or more fields or portions of first tree structure or the second tree structure.

* * * * *